United States Patent
Kondo et al.

(10) Patent No.: US 8,249,305 B2
(45) Date of Patent: Aug. 21, 2012

(54) INFORMATION PROCESSING APPARATUS, INFORMATION PROCESSING METHOD, PROGRAM, AND RECORDING MEDIUM

(75) Inventors: Tetsujiro Kondo, Tokyo (JP); Tetsushi Kokubo, Kanagawa (JP); Kenji Tanaka, Kanagawa (JP); Hitoshi Mukai, Kanagawa (JP); Hirofumi Hibi, Kanagawa (JP); Kazumasa Tanaka, Chiba (JP); Takuro Ema, Tokyo (JP); Hiroyuki Morisaki, Tokyo (JP)

(73) Assignee: Sony Corporation, Tokyo (JP)

( * ) Notice: Subject to any disclaimer, the term of this patent is extended or adjusted under 35 U.S.C. 154(b) by 753 days.

(21) Appl. No.: 12/413,021

(22) Filed: Mar. 27, 2009

(65) Prior Publication Data

US 2009/0252379 A1    Oct. 8, 2009

(30) Foreign Application Priority Data

Apr. 3, 2008   (JP) ................................. 2008-097510

(51) Int. Cl.
*G06K 9/00* (2006.01)
(52) U.S. Cl. ....... 382/107; 382/163; 382/284; 381/94.2; 381/104
(58) Field of Classification Search .................. 382/100, 382/107, 163, 284, 94.2, 104
See application file for complete search history.

(56) References Cited

U.S. PATENT DOCUMENTS

| | | | | |
|---|---|---|---|---|
| 5,548,346 A * | 8/1996 | Mimura et al. | ............... | 348/738 |
| 5,598,478 A * | 1/1997 | Tanaka et al. | ................... | 381/17 |
| 5,959,597 A * | 9/1999 | Yamada et al. | ................... | 345/8 |
| 6,148,085 A * | 11/2000 | Jung | ............................. | 381/104 |
| 6,573,909 B1 * | 6/2003 | Nagao | ........................... | 715/727 |
| 7,577,273 B2 * | 8/2009 | Rhoads et al. | ................ | 382/100 |
| 2006/0210093 A1 * | 9/2006 | Ishibashi et al. | ................ | 381/80 |
| 2008/0008327 A1 * | 1/2008 | Ojala et al. | ........................ | 381/20 |
| 2008/0226119 A1 * | 9/2008 | Candelore et al. | ............ | 382/100 |
| 2008/0275867 A1 * | 11/2008 | Hollemans et al. | ............... | 707/5 |

FOREIGN PATENT DOCUMENTS

| | | |
|---|---|---|
| JP | 6-284330 | 10/1994 |
| JP | 2004-173300 | 6/2004 |
| JP | 2004-328052 | 11/2004 |
| JP | 2005-29518 | 2/2005 |
| JP | 2005-165684 | 6/2005 |
| JP | 2005-295181 | 10/2005 |

* cited by examiner

*Primary Examiner* — Andrew W Johns
*Assistant Examiner* — Shefali Goradia
(74) *Attorney, Agent, or Firm* — Oblon, Spivak, McClelland, Maier & Neustadt, L.L.P.

(57) ABSTRACT

An information processing apparatus includes a feature value detecting section, an image processing section, and an audio processing section. The feature value detecting section determines, when a first image and a second image that are captured at different positions include a specific subject, a feature value of the subject included in the supplied first and second images. The image processing section detects motion of the subject on the basis of the feature value determined by the feature value detecting section. The audio processing section localizes a sound image of the subject in accordance with the motion of the subject detected by the image processing section.

10 Claims, 20 Drawing Sheets

INFORMATION PROCESSING APPARATUS, INFORMATION PROCESSING METHOD, PROGRAM, AND RECORDING MEDIUM

BACKGROUND OF THE INVENTION

1. Field of the Invention

The present invention relates to an information processing apparatus, an information processing method, a program, and a recording medium suitably applied to a case of allowing users to efficiently view a plurality of images displayed on one screen.

2. Description of the Related Art

A plurality of combined images are combined and the combined image is displayed on one screen in the related art. For example, a picture in picture (PinP) function for arranging a plurality of reduced images or embedding a sub image captured at a different angle in a main image is generally used when a plurality of images are simultaneously displayed. At this time, either audio of the main image or audio of the sub image is output.

For example, Japanese Unexamined Patent Application Publication No. 2005-29518 discloses a technique for localizing a sound image in accordance with an absolute position of a focused image.

SUMMARY OF THE INVENTION

When a plurality of images are presented on one screen, localization of a sound image is not considered. Accordingly, when a main image and a sub image both including a specific subject are displayed on one screen, it is difficult to instinctively understand which scene of another image corresponds to a focused scene of one image. For example, when a zoom image of a soccer player is displayed as a main image and a panned image of a soccer field is displayed as a sub image, it is difficult for viewers to immediately understand a location of the soccer player, shown in the zoom image, in the panned image.

In view of such a circumstance, it is desirable to realize efficient viewing when a plurality of images including a specific subject are simultaneously displayed on one screen.

According to an embodiment of the present invention, when a first image and a second image that are captured at different positions include a specific subject, a feature value of the subject included in the supplied first and second images is determined. Motion of the subject is detected on the basis of the determined feature value. A sound image of the subject is localized in accordance with the detected motion of the subject.

With such a configuration, motion of a subject is clearly indicated by localizing a sound image of the subject included in images (hereinafter, referred to as localization of a sound image). Accordingly, when a plurality of images are displayed on one screen, users can easily understand motion of the subject without tracking the motion of the subject included in each image with their eyes.

According to an embodiment of the present invention, localization of a sound image advantageously helps users to understand motion of a subject more easily.

DESCRIPTION OF THE PREFERRED EMBODIMENTS

An embodiment of the present invention will be described below with reference to FIGS. 1 to 18B. A description will be given for an example in which an information processing apparatus according to an embodiment of the present invention is applied to an information processing system 1 capable of displaying images captured by a plurality of cameras at different angles (different locations) and different zoom levels (magnification factors) on one screen.

Figure 1:
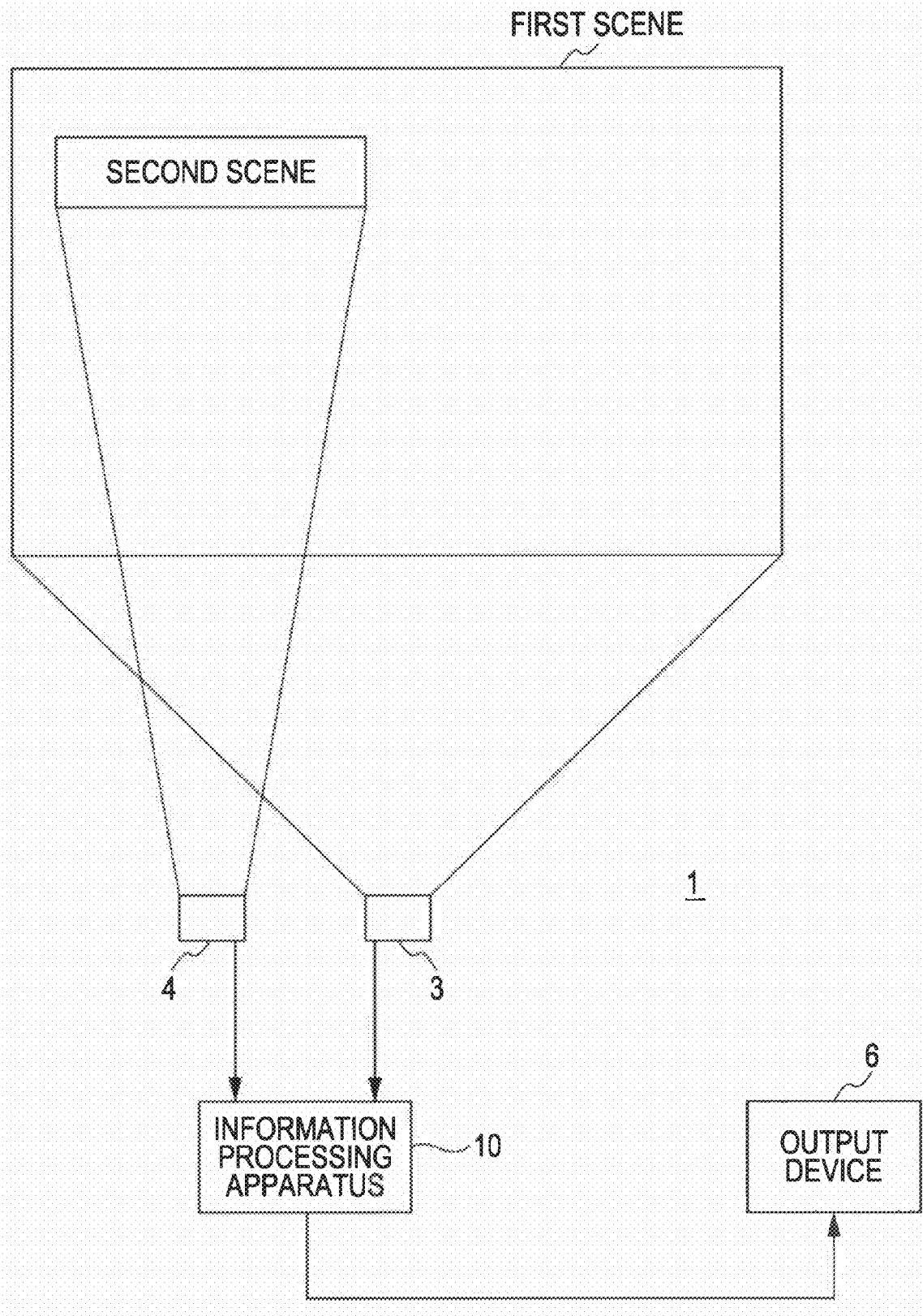
FIG. 1 is an explanatory diagram showing an example of an arrangement of an information processing system according to an embodiment of the present invention.

FIG. 1 shows an example of an arrangement of the information processing system 1 according to this embodiment.

The information processing system 1 includes a first camera 3 that captures a first scene and generates a first image, and a second camera 4 that captures a second scene, which is narrower than the first scene, and generates a second image. The information processing system 1 also includes an information processing apparatus 10 that generates a combined image on the basis of the first image supplied from the first camera 3 and the second image supplied from the second camera 4, and an output device 6 that displays the image generated by the information processing apparatus 10.

The first camera 3 and the second camera 4 employ different angles and zoom levels. The output device 6 displays images and outputs sound. The first scene and the second scene include a specific subject. In this embodiment, it is assumed that the first camera 3 pans to capture and generate the first image. The second camera 4 zooms to capture and generate the second image. Accordingly, the first scene includes a broader range than the second scene.

The information processing apparatus 10 stores images and audio of multi-angle broadcasting or images and audio of a scene captured by a user at different angles in a storage section 11 (see FIG. 2 to be described later). The information processing apparatus 10 also generates a combined image by superimposing a sub image on a main image. Here, the main image is selected from a plurality of images supplied from the first camera 3 and the second camera 4, whereas another image whose size is smaller than the main image is selected as the sub image.

The output device 6 may be, for example, a liquid crystal display, an electro-luminescence (EL) display, or a projector. The output device 6 has a speaker that outputs sound. Basically, a plurality of superimposed images are displayed. However, the image outputting method is not limited. For example, only images that the user wants to focus may be output. In addition, a plurality of images may be displayed on a plurality of display devices.

A localization position of a sound image moves in three-dimensional space, i.e., up and down, left and right, and back and forth. Upon receiving a panned image including a whole scene and a zoom image including a detailed part of the panned image, the information processing apparatus 10 determines the localization position of the sound image in accordance with a subject included in the panned image to allow a user to instinctively understand the position of the subject, included in the zoom image, in the panned image on the basis of the plurality of images.

A combination of input signals is not limited to a combination of an image signal and an audio signal. When information on a position of an object and information on movement of a sound source are included in image and audio data as metadata, to increase accuracy of processing for localizing a sound image using such data is also referred to as "a combination of input signals".

Since a sound image is localized by mixing a plurality of image signals and a plurality of audio signals, a user can naturally move their line of sight while viewing a plurality of images. In addition, since the eyes follow movement of localized sound, the user can easily identify an object in a plurality of screens.

Figure 2:
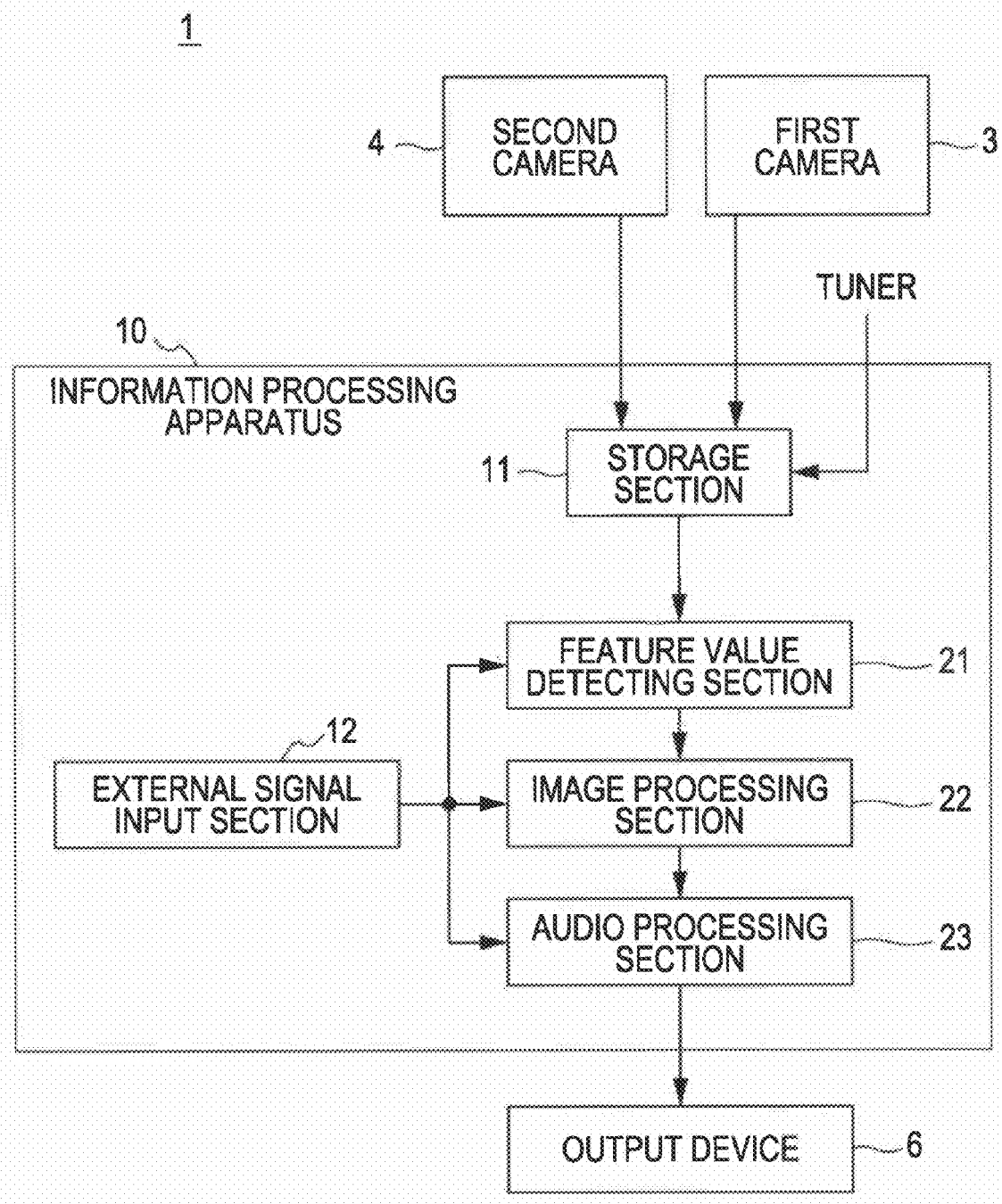
FIG. 2 is a block diagram showing an example of an internal configuration of an information processing apparatus according to an embodiment of the present invention.

FIG. 2 shows an example of an internal configuration of the information processing apparatus 10.

The information processing apparatus 10 includes a storage section 11 for storing images supplied from the first camera 3, the second camera 4, and a tuner. The information processing apparatus 10 also includes a feature value detecting section 21 for detecting a feature value of a subject included in supplied images, an image processing section 22 for performing predetermined processing on images read out from the storage section 11, and an audio processing section 23 for performing predetermined processing on audio data read out from the storage section 11. A combined image processed by the image processing section 22 is displayed on the output device 6. Localized audio data processed by the audio processing section 23 is output by the output device 6.

When a first image and a second image that are captured at different positions includes a specific subject, the feature value detecting section 21 determines a feature value of the subject from the first and second images.

The image processing section 22 detects motion of the subject on the basis of the feature value determined by the feature value detecting section 21. The audio processing section 23 localizes a sound image of the subject in accordance with the motion of the subject detected by the image processing section 22. The feature value detecting section 21, the image processing section 22, and the audio processing section 23 may be implemented by, for example, a central processing unit (CPU).

In addition, the information processing apparatus 10 includes an external signal input section 12 for receiving, as sensor information, information on user operations, user information, and information on a room environment of the user. The user information includes, for example, information on the number of users viewing presented images and information for selecting an image presenting method. The user's room environment includes, for example, information on the size and shape of the room where images are presented and information on the number of speakers and display screens and an arrangement thereof. The information input through the external signal input section 12 is supplied to the feature value detecting section 21, the image processing section 22, and the audio processing section 23.

The storage section 11 may be a mass storage device or a mass recording medium, such as a hard disk drive (HDD), for example. Images stored in the storage section 11 may be, for example, digital data compressed according to the moving picture expert group-2 (MPEG-2) standard. Kinds of the images include moving images and still images supplied from a camera, a tuner, and a storage device. Hereinafter, these kinds of information are referred to as content. The storage section 11 also stores camera information (e.g., information on a position, an angle, and a magnification factor of the camera). In response to selection by a user or automatic determination by the information processing apparatus 10, the information stored in the storage section 11 is processed so that a plurality of images and audio are presented at the same time.

The information processing apparatus 10 processes images using the YUV color space, for example. In a YUV coordinate system used in the YUV color space, colors are represented by a color space defined by a luminance signal (Y), a color-difference signal (U) between the luminance signal and a blue signal, and a color-difference signal (V) between the luminance signal and a red signal. A range that can be represented by this color space is called a color gamut. Pixels constituting an image supplied to the information processing apparatus 10 are represented by the YUV color space. In this embodiment, a position on the UV coordinates determined for each pixel is referred to as "a color gamut".

The feature value detecting section 21 determines a color gamut included in a plurality of images of a specific subject as a feature value. At this time, a main image and a sub image are determined. The color gamut is detected for each pixel constituting the image. The color gamut can be represented by a three-dimensional frequency distribution graph. When a color appears many times in an image, an appearing frequency of the color gamut corresponding to the color is accumulated. If the accumulated frequency value exceeds a predetermined threshold, a part of the image including the color gamut that appears frequently (hereinafter, referred to as a "frequently appearing part") is extracted as a feature area of the image.

Figure 3:
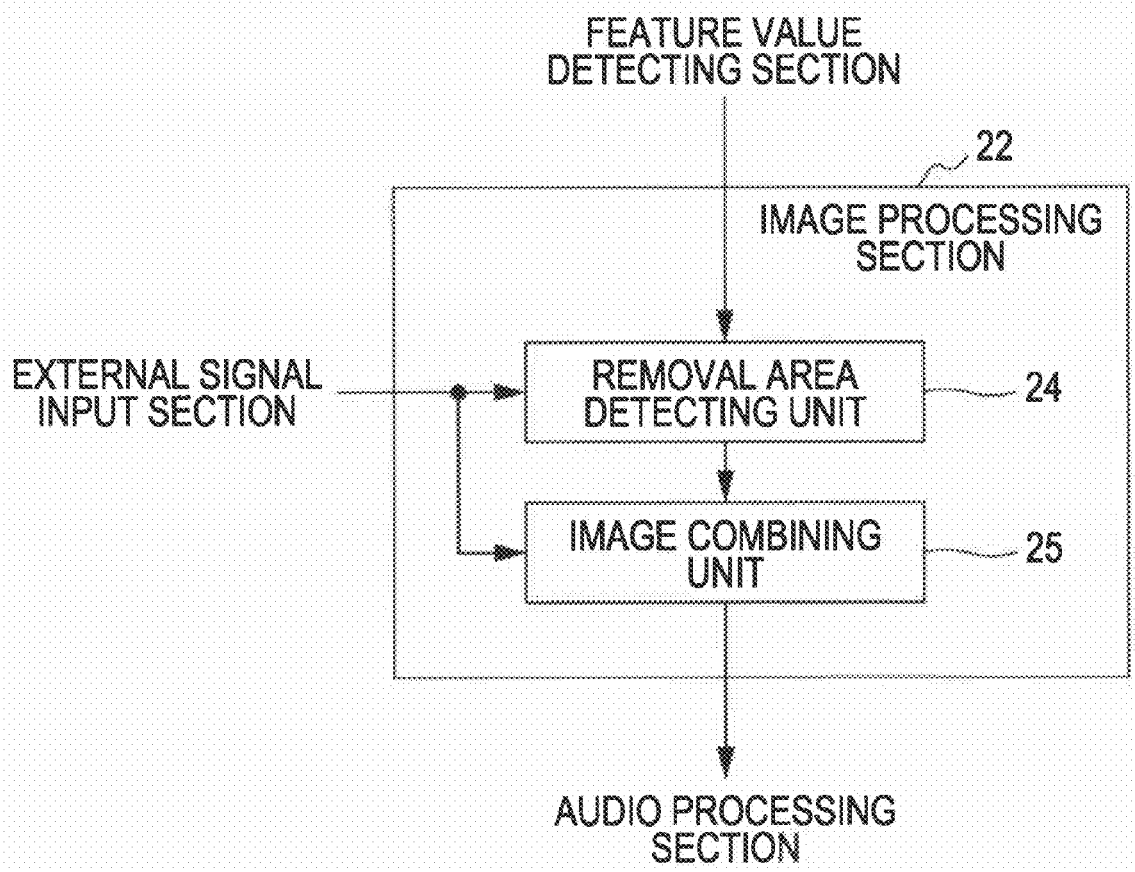
FIG. 3 is a block diagram showing an example of an internal configuration of an image processing section according to an embodiment of the present invention.

FIG. 3 shows an example of an internal configuration of the image processing section 22.

The image processing section 22 includes a removal area detecting unit 24 for detecting an area to be removed from a sub image, and an image combining unit 25 for combining the detected-area-removed sub image with a main image.

The removal area detecting unit 24 identifies a common color gamut from the color gamuts of a plurality of images determined by the feature value detecting section 21, and removes an area corresponding to the common color gamut from a sub image. At this time, an area including the color gamut commonly existing in the feature areas of the main image and the sub image is removed from the main image or the sub image. For example, when an image of a ground is included both in a main image and a sub image, the color gamut of the ground is detected as color gamut appearing on a screen frequently (hereinafter, referred to as "a frequently appearing color gamut"). The image of the ground including the frequently appearing color gamut is removed as the frequently appearing part.

The image combining unit 25 superimposes a sub image from which an area corresponding to the common color gamut is removed by the removal area detecting unit 24 on a main image to combine the sub image with the main image. User operations are performed on an operation section, not shown, such as a remote control, buttons, and a touch panel. The operation section is connected to the external signal input section 12. Through the operation section, a user can switch the main image and the sub image or adjust volume of sound of a sound image of the subject included in the first image localized by the audio processing section 23. Operation signals output by the operation section are supplied through the external signal input section 12. The color gamut determined by the feature value detecting section 21, a predetermined threshold, and an area to be removed by the removal area detecting unit 24 are then determined. Similarly, a position of the sub image superimposed on the main image by the image combining unit 25 is determined on the basis of the input signal supplied from the operation section. This position is determined, for example, by a position instructed through a touch panel. AS a result, the displayed combined image looks natural to users.

Figure 4:
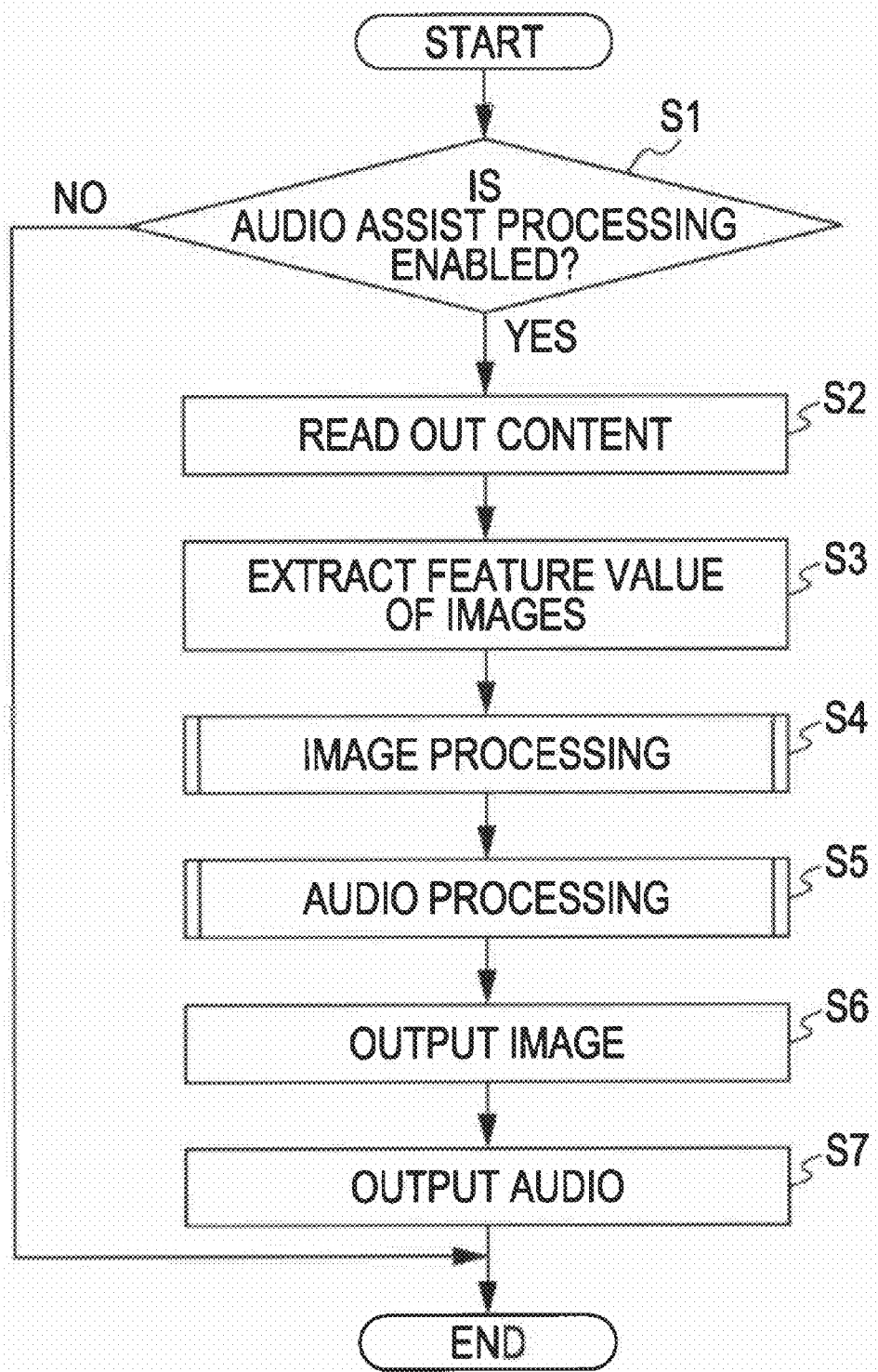
FIG. 4 is a flowchart showing an example of color gamut detecting processing and image combining processing according to an embodiment of the present invention.

FIG. 4 shows an example of main processing performed by the information processing apparatus 10.

Whether audio assisting processing is enabled is determined (STEP S1). The audio assisting processing corresponds to processing for localizing a sound image on the basis of a subject included in a panned image when the panned image is combined with a zoom image. If the audio assisting processing is disabled, the main processing terminates.

If the audio assisting processing is enabled, the feature value detecting section 21 reads out content stored in the storage section 11 (STEP S2). The feature value detecting section 21 detects a feature value commonly existing in the first image and the second image, included in the read out content, captured at different angles (STEP S3).

Whether a specific subject (hereinafter, also referred to as an "object") is included in the plurality of images selected from the read out content is determined. The shape of the object is also determined. This determination is performed by matching the feature values of the subject included in the images.

Alternatively, a user may input a corresponding point indicating the subject of an image displayed on the output device 6. The subject corresponding to the corresponding point is set as an initial value. The initial value may be a position of the object, magnitude of a motion vector, and a contour of the object. In response to setting of the initial value, a specific part of an image can be detected and the motion thereof can be tracked by input of a motion vector of an object (e.g., a ball, a human figure, and a player's number) or a user operation. As processing for matching feature values of a subject, estimation based on block matching in a frame or matching of a motion amount is employable.

A subject to which the initial value indicating the subject is set is treated as a focused object. The feature value detecting section 21 detects motion of the focused object and tracks the position of the object in each image.

Figure 5:
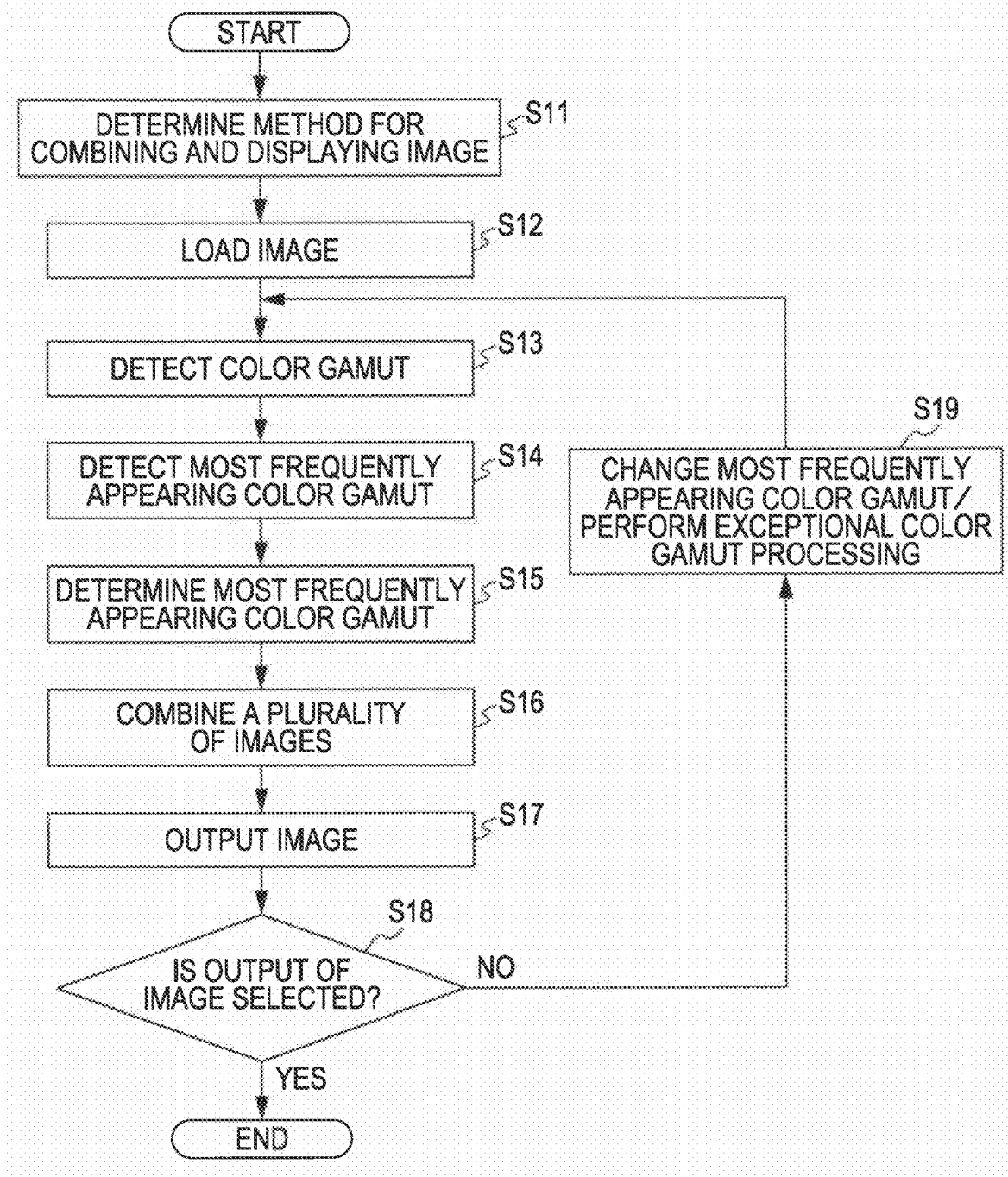
FIG. 5 is a flowchart showing an example of image processing according to an embodiment of the present invention.

The image processing section 22 performs predetermined image processing shown in FIG. 5 (STEP S4). In response to detection of the feature value, the image processing section 22 processes the image. This processing is performed in accordance with a request input through a user operation or an environment in which the image is output.

For example, when the output device 6 has only one display screen, a plurality of superimposed images are displayed. Depending on a kind of image processing, created images may be displayed on a plurality of display screens.

The audio processing section 23 then performs predetermined audio processing (STEP S5). Here, processing for determining a localization position of a sound image is performed on the basis of a positional relationship of the object included in an image from which the focused object is detected.

For example, when processing is controlled so that the specific subject included in the images is located at the same position on one screen, audio is localized at a position of the displayed subject. When a subject focused by a user is not located at the same position on a screen, a sound image of the subject included in one image is localized at a position of the focused subject in another image. Sound image localization is a technique for allowing a user to feel that sound is output from the sound image by locating a virtual sound image in a space. For example, when right and left speakers simultaneously output sound at the same volume, a sound image is localized at the middle of the right and left speakers. If the volume of the left and right speakers is changed or timing of outputting the sound is shifted, the localized sound image moves. Accordingly, a user can feel motion of the sound image.

The image processing section 22 outputs the processed image to the output device 6 (STEP S6). The output device 6 then displays the processed image on a display screen.

The audio processing section 23 processes audio data on the basis of the image processed by the image processing section 22 and outputs the processed audio data to the output device 6 (STEP S7). The output device 6 then outputs sound of the processed audio data from a speaker. A sound image of the sound output by the output device 6 is localized at a position of the subject in the panned image.

The motion of the sound image of the subject included in the image is localized particularly on the basis of the motion of the panned image. Accordingly, a user can naturally understand a moving position of a subject in a panned image while viewing the subject in a zoom image and listening to the sound of the sound image localized at the position of the subject of the panned image.

FIG. 5 is a flowchart showing an example of image processing.

First, the image processing section 22 determines a method for combining a plurality of images and a method for displaying the combined image on the output device 6 (STEP S11). This determination is performed on the basis of a user operation and a user environment state input through the external signal input section 12.

The image processing section 22 loads images from the feature value detecting section 21 (STEP S12). The image processing section 22 then detects color gamuts for each pixel of the plurality of loaded images (STEP S13).

The removal area detecting unit 24 detects the frequently appearing color gamut from the plurality of loaded images (STEP S14). The removal area detecting unit 24 determines an area including the frequently appearing color gamut to be removed from the second image (STEP S15), and removes the frequently appearing color gamut from the determined area.

The image combining unit 25 superimposes the second image from which the frequently appearing color gamut is removed on the first image (STEP S16). The image combining unit 25 outputs the combined image to the output device 6.

The image combining unit 25 determines whether to display the combined image on the output device 6 (STEP S18). If the output image is not an intended image, the frequently appearing color gamut is changed and the color gamut is determined again (STEP S19).

At this time, an area including the color gamut to be removed is changed or exceptional processing is performed on the basis of a user operation or using an operation log. The exceptional processing is processing for resetting the color when the area removed by the removal area detecting unit 24 is larger than expectation. The process then returns to STEP S13.

If the image intended by the user is obtained, the image combining processing terminates.

Figure 6:
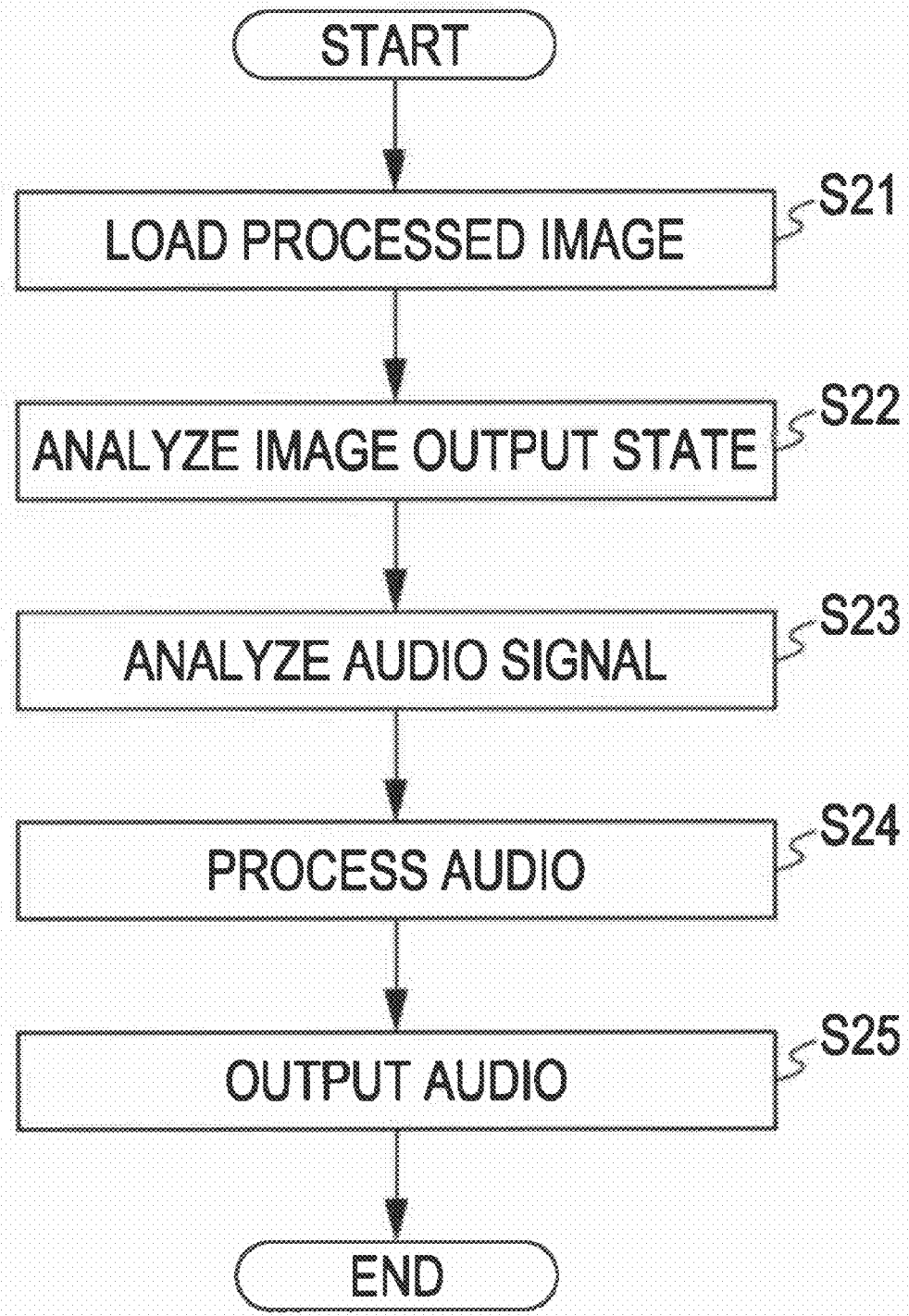
FIG. 6 is a flowchart showing an example of audio processing according to an embodiment of the present invention.

FIG. 6 is a flowchart showing an example of audio processing.

The audio processing section 23 loads images processed by the image processing section 22 (STEP S21). The audio processing section 23 analyzes a method for outputting the images processed by the image processing section 22 (STEP S22). At this time, the audio processing section 23 detects the image presenting method and the number of display devices, and analyzes a relation between the audio and the image (STEP S23).

The audio processing section 23 analyzes how a sound source is input (STEP S24). At this time, the audio processing section 23 switches a localization position of a sound image by switching the feature value of the image signal and the feature value of the audio signal. In this processing, the sound image of the object included in the zoom image is localized in accordance with motion of the object included in the panned image. To replace motion of the sound signal of the zoom image with the motion of the object included in the panned image is referred to as "replacement of feature values". The processed audio is output by a speaker of the output device 6 (STEP S25).

FIGS. 7-15 show examples of images to be superimposed and examples of a color gamut thereof.

Figure 7:
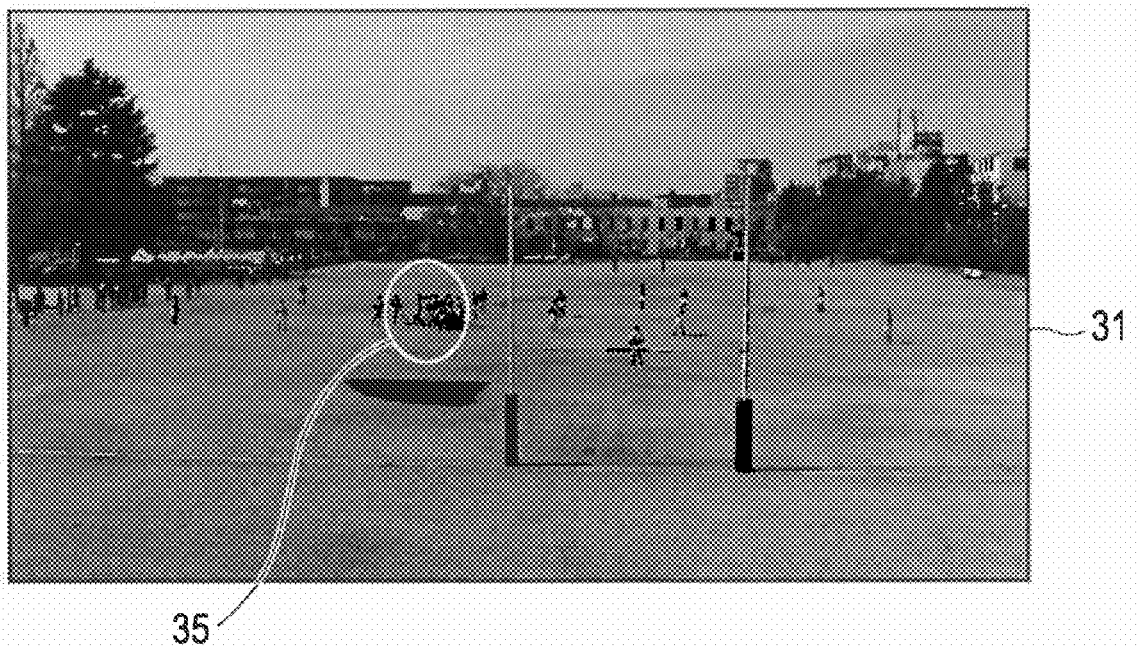
FIG. 7 is an explanatory diagram showing an example of a first image according to an embodiment of the present invention.

FIG. 7 shows an example of a first image 31 captured by the first camera 3.

Figure 8:
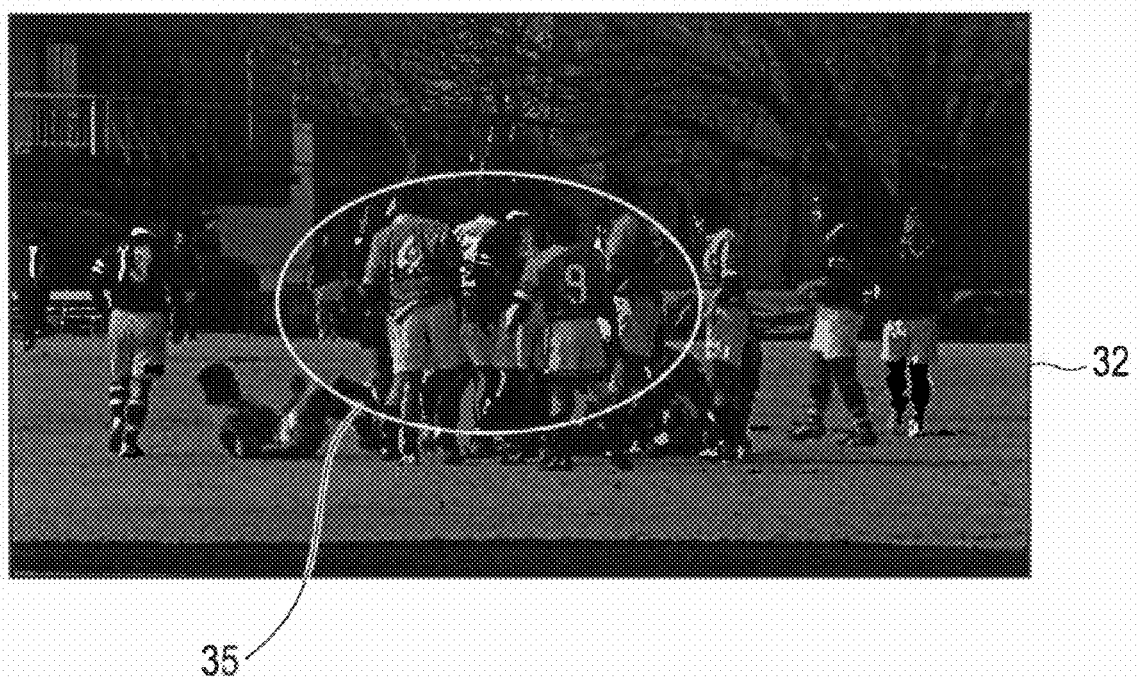
FIG. 8 is an explanatory diagram showing an example of a second image according to an embodiment of the present invention.

FIG. 8 shows an example of a second image 32 captured by the second camera 4.

Images supplied to the information processing apparatus 10 include the same scene. In this example, the first image 31 is a panned image of a subject 35 (ruck in rugby). The second image 32 is a zoom image of the subject 35 included in the first image 31. A plurality of images read out from the storage section 11 include, for example, an original image, a zoom image of a part of the original image, and a plurality of processed images of different angles. These images include the same subject.

Before image superimposing processing is performed, a user selects a main image from a plurality of images. Here, the second image 32 is selected as the main image. In this embodiment, a zoom image is used as the main image and a processed panned image is used as a sub image.

Figure 9:
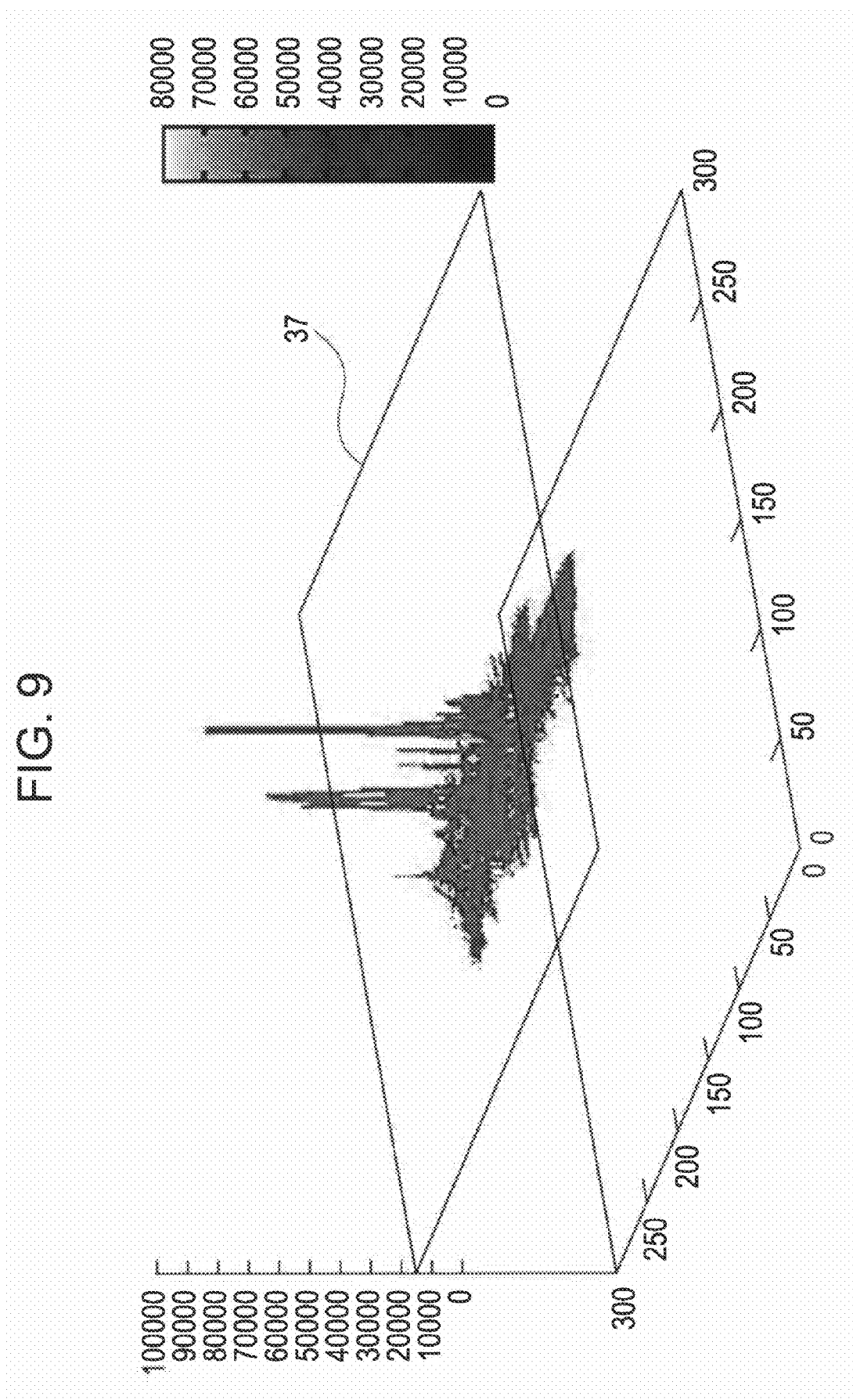
FIG. 9 is an explanatory diagram showing an example of color gamut distribution of a first image according to an embodiment of the present invention.

FIG. 9 shows an example of color gamut distribution of the first image 31.

Figure 10:
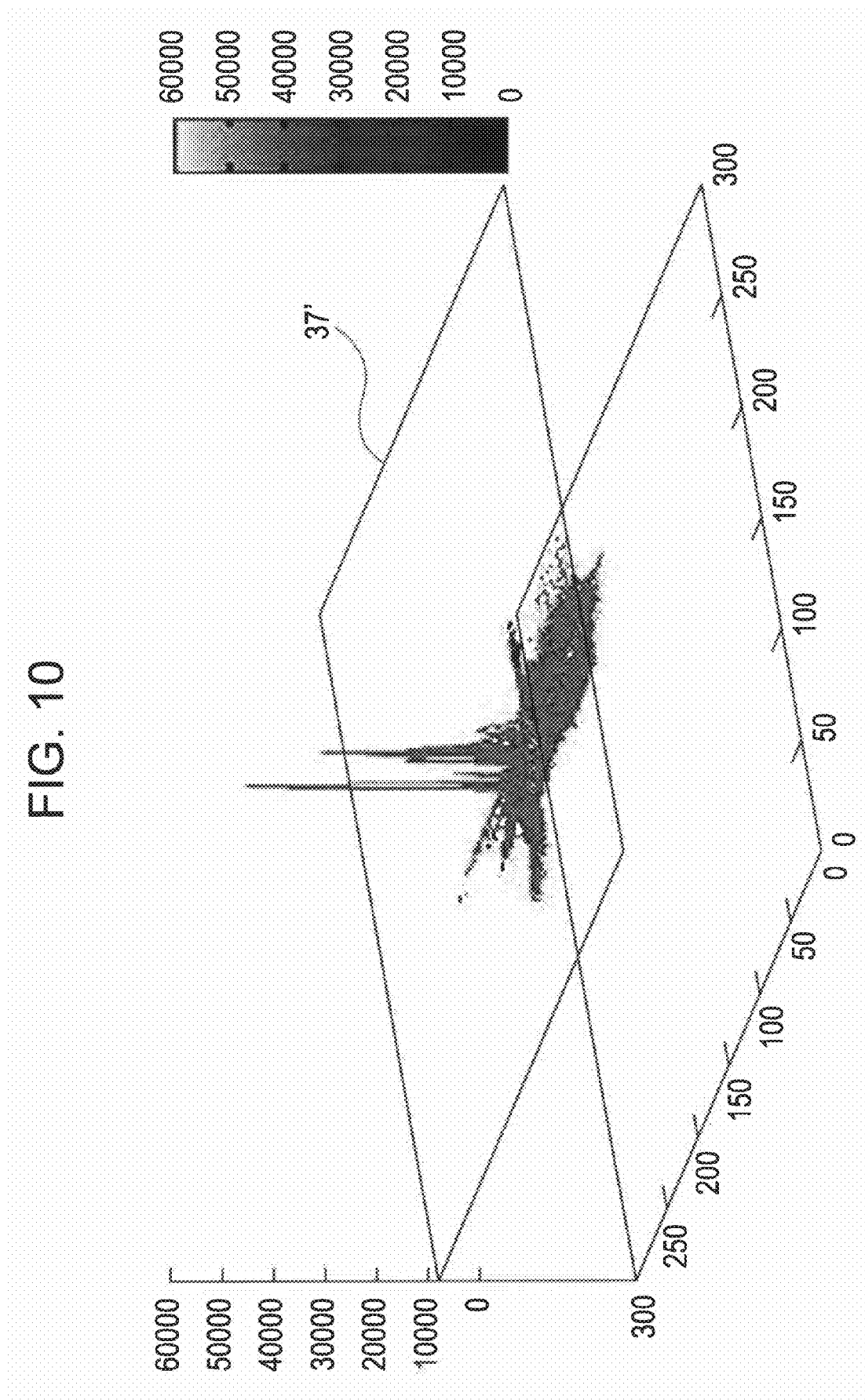
FIG. 10 is an explanatory diagram showing an example of color gamut distribution of a second image according to an embodiment of the present invention.

FIG. 10 shows an example of color gamut distribution of the second image 32.

In a description given below, a diagram of the color gamut distribution shows color-difference signals U and V of the YUV coordinate system and a frequency of each color gamut. When cameras used in capturing of images have different numbers of pixels, the frequency range of the color gamut diagram differs. Accordingly, to determine a common color gamut, normalization is performed to adjust the frequency. The normalization is processing for setting the maximum frequency value of two images to the same value.

FIGS. 9 and 10 show thresholds 37 and 371 for determining the frequently appearing color gamut, respectively. The color gamut exceeding the thresholds indicates a color frequently included each image. The feature value detecting section 21 determines color gamut distribution of a whole area of each input image. The feature value detecting section 21 normalizes each color gamut distribution and detects an area having the common color gamut from a plurality of input image signals. At this time, the feature value detecting section 21 corrects parameters of the first camera 3 and the second camera 4 to adjust the frequently appearing color gamut. The feature value detecting section 21 may use a color gamut conversion table. The feature value detecting section 21 then determines the color gamut to be removed from an image to be superimposed. However, an area including the detected color gamut does not necessarily correspond to an area to be removed one to one.

Figure 11:
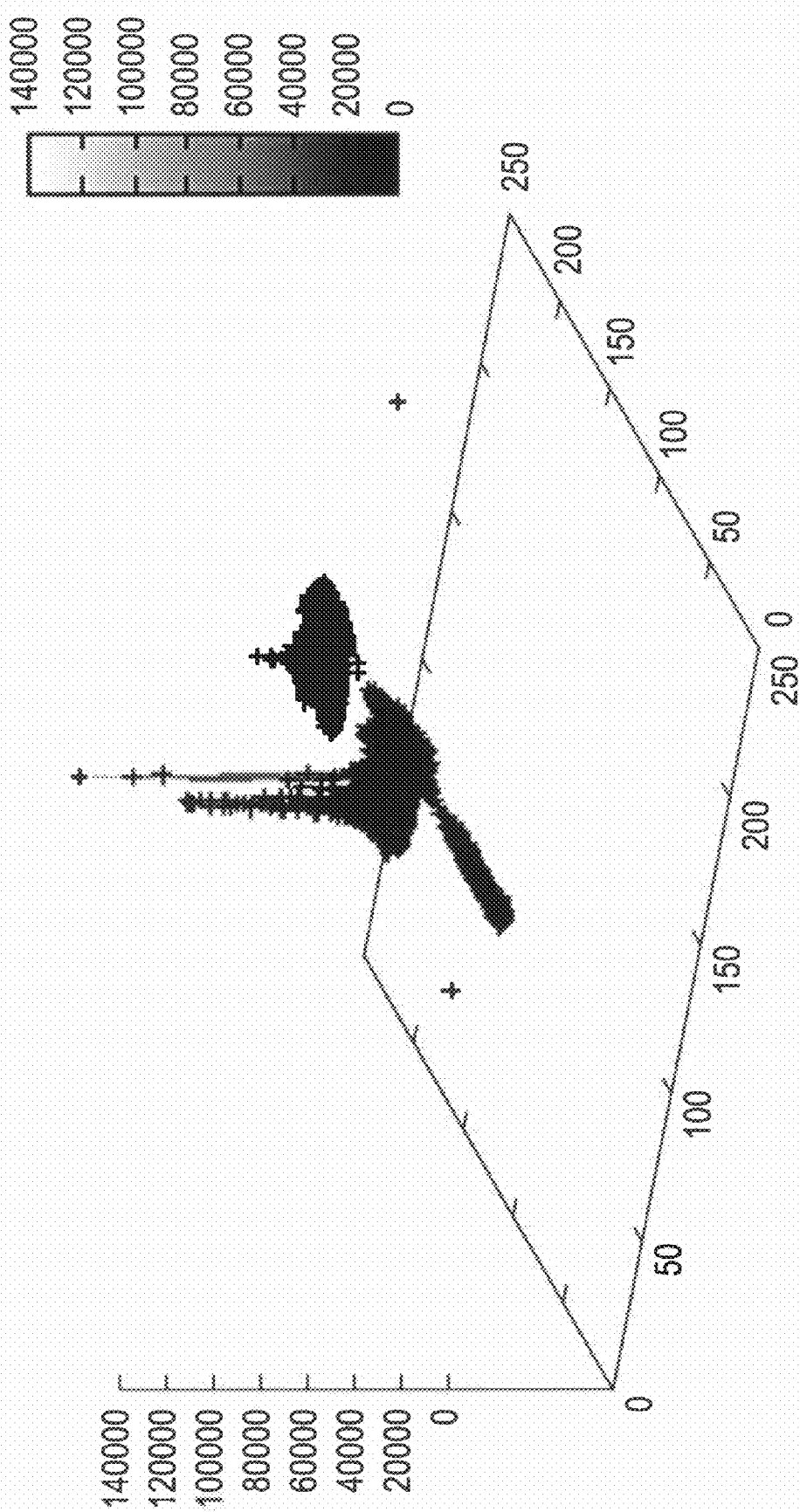
FIG. 11 is an explanatory diagram showing an example of a color gamut of a first image exceeding a threshold according to an embodiment of the present invention.

FIG. 11 shows an example of a color gamut of the first image 31 exceeding a threshold.

Figure 12:
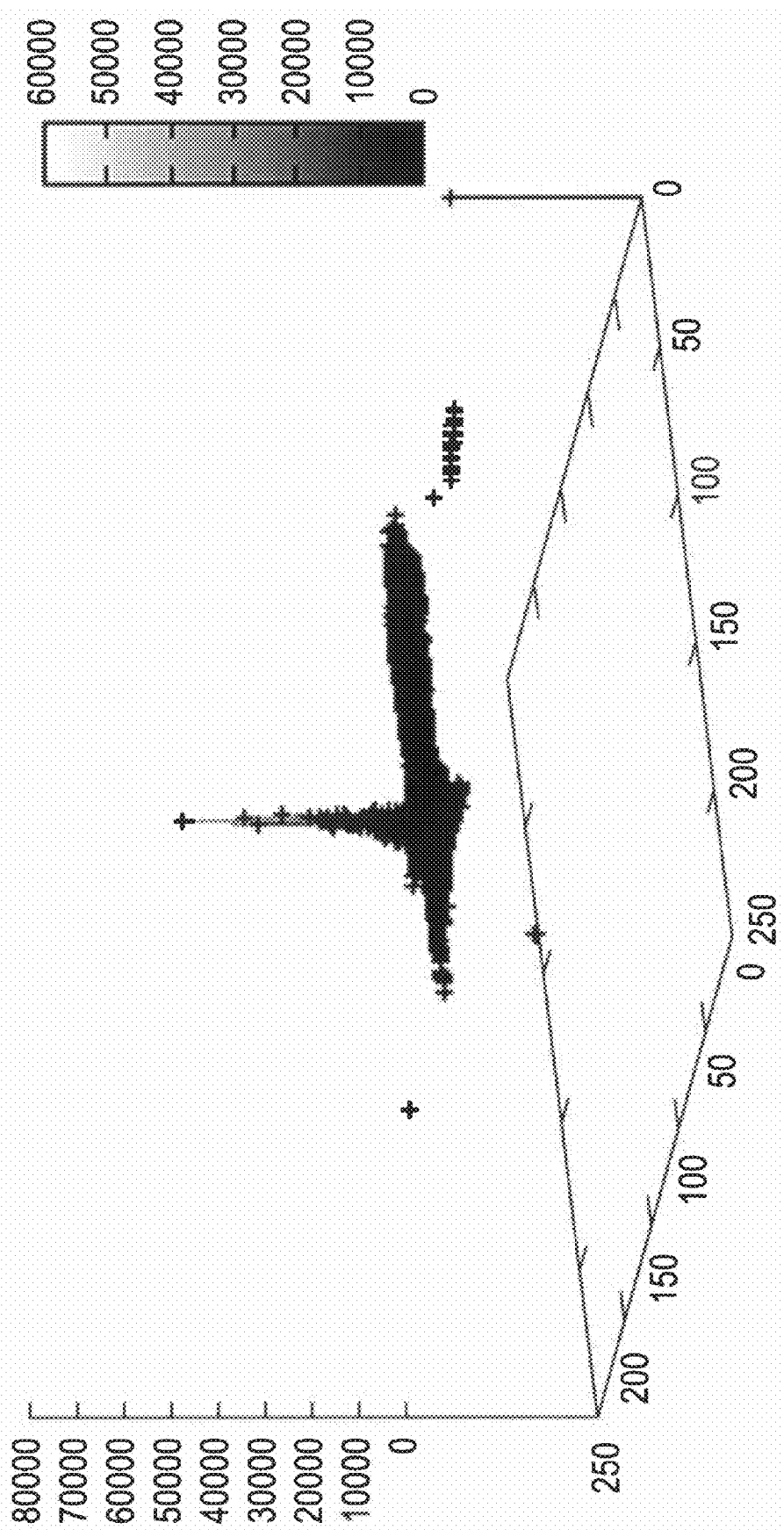
FIG. 12 is an explanatory diagram showing an example of a color gamut of a second image exceeding a threshold according to an embodiment of the present invention.

FIG. 12 shows an example of a color gamut of the second image 32 exceeding a threshold.

FIGS. 11 and 12 show the color gamut exceeding the predetermined thresholds 37 and 37' extracted from the color gamut distribution shown in FIGS. 9 and 10, respectively. A user can freely change the thresholds. The color gamut commonly included in the first image 31 and the second image 32 is determined in the following manner.

Figure 13:
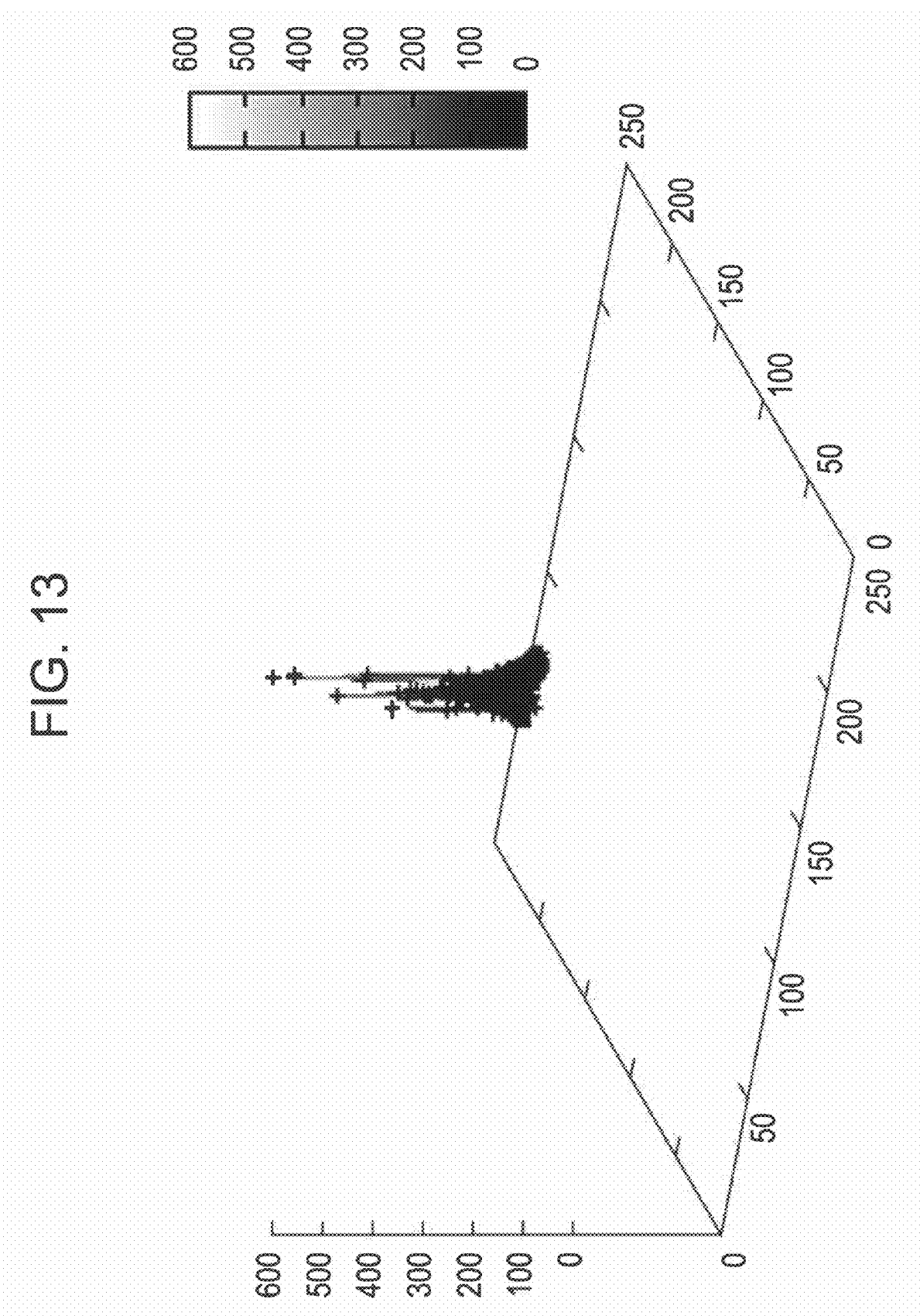
FIG. 13 is an explanatory diagram showing an example of a three-dimensionally-displayed color gamut of color gamut distribution of first and second images commonly exceeding a threshold according to an embodiment of the present invention.

FIG. 13 shows an example of a color gamut that commonly exceeds the thresholds in the first image 31 and the second image 32.

Figure 14:
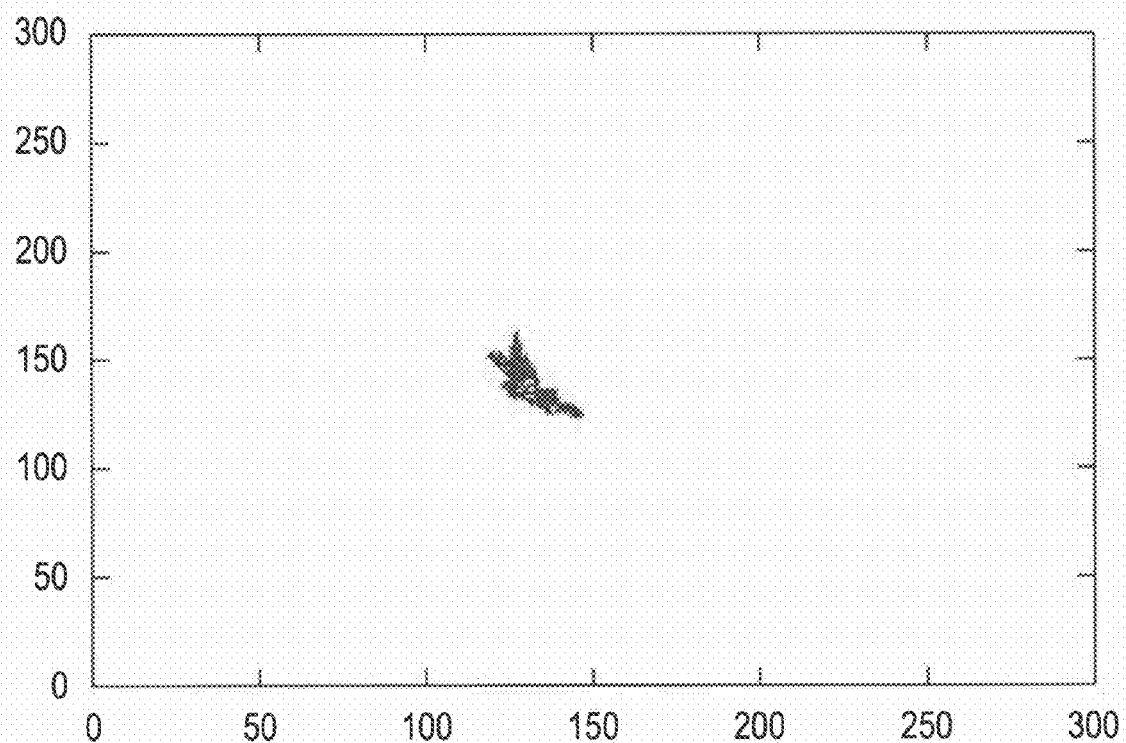
FIG. 14 is an explanatory diagram showing an example of a two-dimensionally-displayed color gamut of color gamut distribution of first and second images commonly exceeding a threshold according to an embodiment of the present invention.

FIG. 14 shows an example of a two-dimensionally-displayed color gamut commonly included in the first image 31 and the second image 32.

A color most frequently appearing in the first image 31 and the second image 32 in common is a color of a ground (e.g., brown). Accordingly, parts exceeding the predetermined thresholds are extracted from the color gamut distribution shown in FIGS. 9 and 10 to determine a color gamut common to both images. If the common color gamut is not present, the thresholds are lowered to target a broader color gamut distribution area. The common color gamut is then determined. The removal area detecting unit 24 removes the color gamut of the corresponding area.

Figure 15:
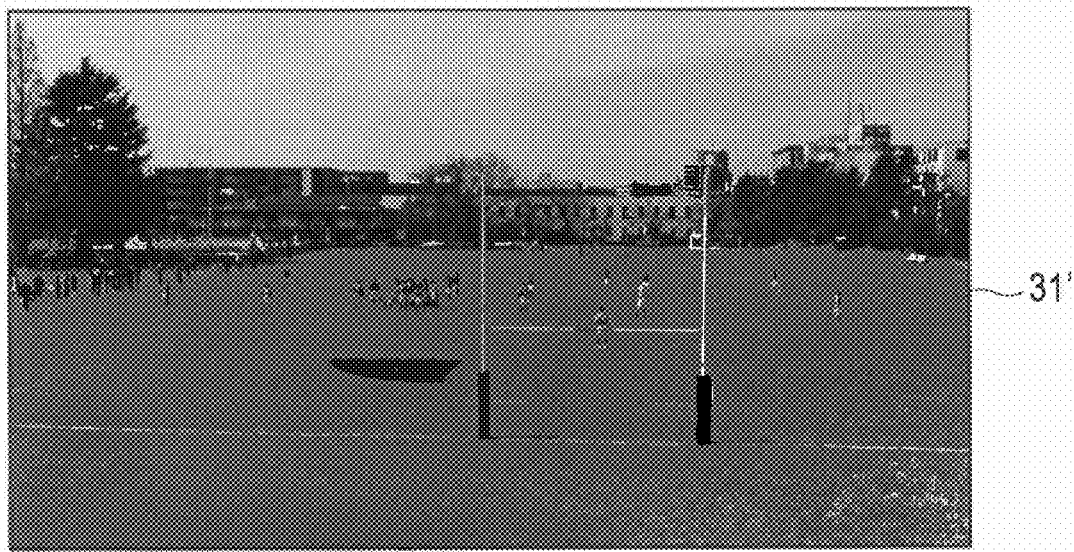
FIG. 15 is an explanatory diagram showing an example in which a predetermined color gamut (color of a ground) is removed from a second image according to an embodiment of the present invention.

FIG. 15 shows an example of a first image 31' resulting from image processing of the first image 31.

The image shown in FIG. 15 is obtained by extracting the most frequently appearing common part in the two images (i.e., the first image 31 and the second image 32). Extraction of this common part is used as a method for extracting a background from a plurality of images.

After the main image (the second image 32) is determined, the most frequently appearing color gamut, which is commonly included in the sub image (the first image 31) and is extracted as a redundant common part, is determined. The most frequently appearing color gamut in the first image 31 is a color of a ground that occupies substantially a half of the screen. Similarly, the most frequently appearing color gamut in the second image 32 is also a color of a ground that occupies substantially a half of the screen. Accordingly, the first image 31' is generated by removing the most frequently appearing color gamut from the first image 31.

Depending of a kind of scene, motion of each camera is cancelled to determine the most frequently appearing color gamut. At this time, the most frequently appearing motion vector value is used as a common part of a plurality of images. When images are captured with a plurality of cameras, it may be difficult to determine matching of the images depending of movement of panning or tilting cameras. Accordingly, by canceling the motion amount of cameras before matching the images, processing for increasing the matching accuracy is performed. This processing is also referred to as "cancellation of motion of a camera". When colors included in images are determined, the processing for canceling the motion of cameras may be omitted. On the other hand, when an object is identified by detecting the most frequently appearing motion vector, the processing for canceling the motion of the cameras is performed.

Figure 16A:
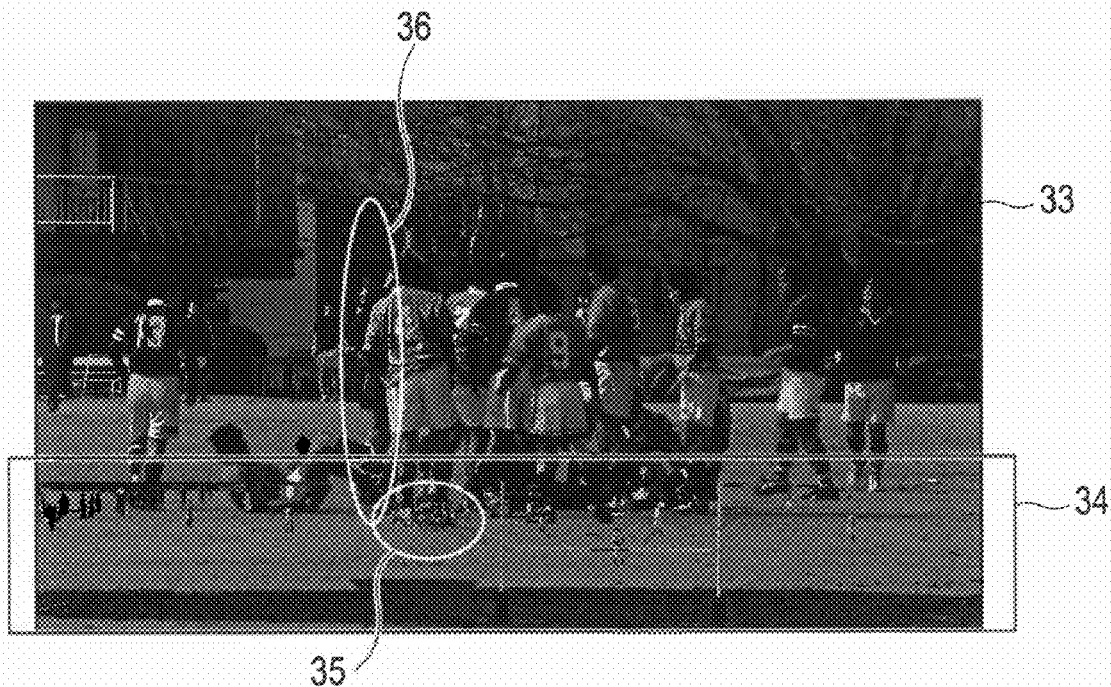
FIGS. 16A and 16B are explanatory diagrams showing examples of a combined image according to an embodiment of the present invention.
Figure 16B:
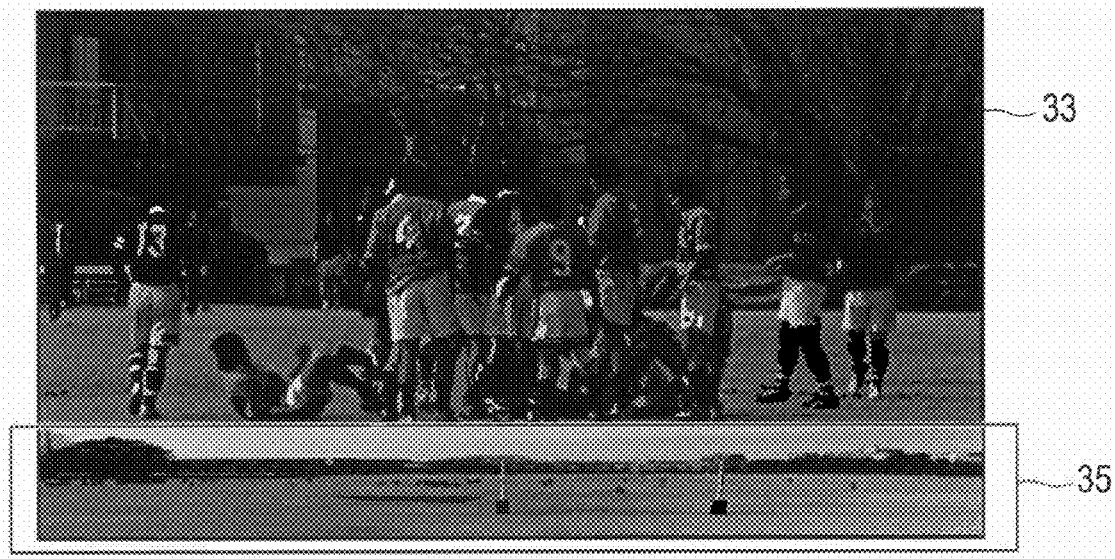

FIGS. 16A and 16B show examples of a combined image 33 obtained by combining a sub image, namely, the first image 31, with a main image, namely, the second image 32.

FIG. 16A shows an example of a combined image obtained when a common color gamut is removed.

FIG. 16B shows an example of a combined image obtained when a common color gamut is not removed.

In this case, the processed first image 31 (i.e., the first image 31') is superimposed on the second image 32. The image processing performed on the first image 31 is similar to that described with reference to FIG. 15. The first image 31' serving as the sub image is superimposed after the zoom ratio is changed. The zoom ratio and shape of the combined image are changed through a user operation. For example, in the case of a moving image, movement of each people becomes clear. Accordingly, a user can view the superimposed natural image. In addition, a plurality of images can be superimposed after removal of the common part (in this example, the color gamut of the ground). In this manner, the user moves their line of sight less frequently while viewing the image.

A localization position of a sound image of the second image 32 is determined on the basis of the position of the subject in the first image 31 and a change in the object. For example, when sound is captured by a pin microphone attached to an umpire 36 shown in FIG. 16A, the localization position of the sound image is determined on the basis of the subject 35 included in a panned image 34, which is the first image 31' whose zoom ratio is changed. When the second image 32 is displayed as the main image, the panned image 34 is displayed as the sub image. Thus, the sound image is localized at the position (on the left) of the subject 35.

The combined image 33 is obtained by superimposing a part of the first image 31 at a lower part of the second image 32. The position where the first image 31 is superimposed is not limited to the lower part and may be an upper part or a middle part of the second image 32. In addition, like the combined image 33 shown in FIG. 16B, the sub image may be embedded in the main image.

Figure 17A:
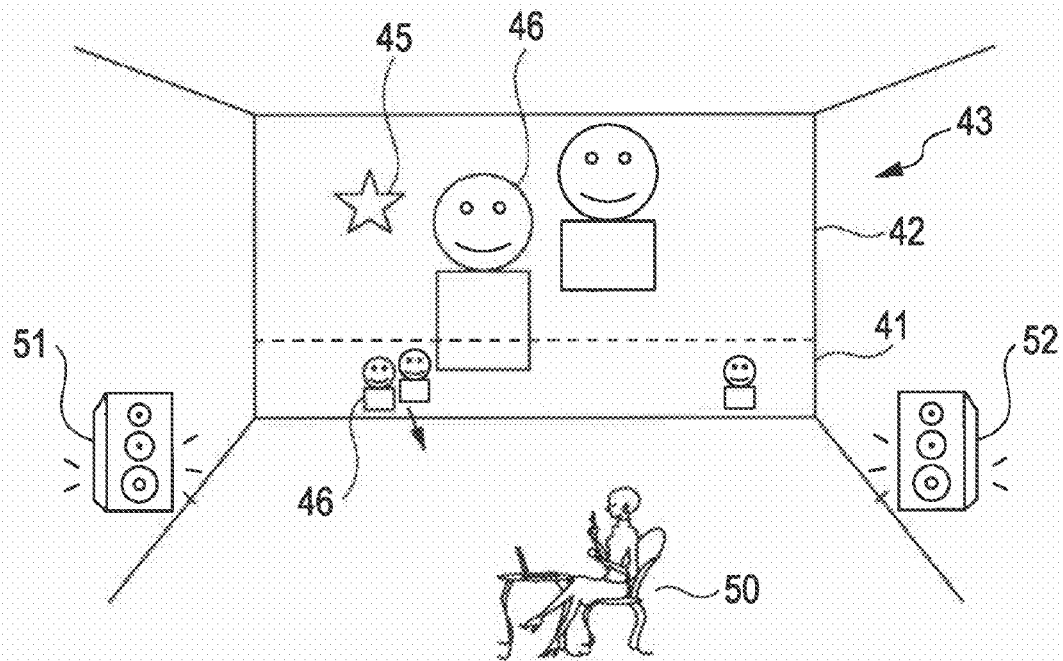
FIGS. 17A and 17B are explanatory diagrams showing an example of a localization position of a sound image of a zoom image that changes as time passes according to an embodiment of the present invention.
Figure 17B:
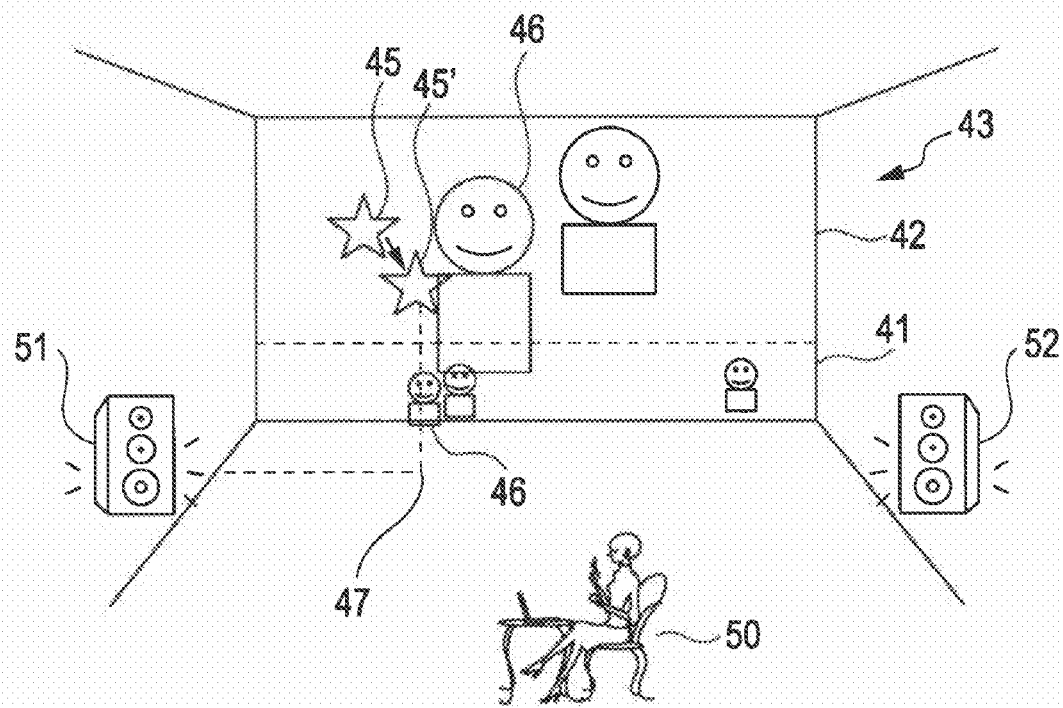

FIGS. 17A and 17B show examples of a localization position of a sound image of a zoom image that changes as time passes.

FIG. 17A shows an example of a combined image and an example of a sound image at time t.

FIG. 17B shows an example of a combined image and an example of a sound image at time t+1.

As shown in FIGS. 17A and 17B, a sound image is localized at a position of a subject 46 included in a first image 41. The localization position of the sound image moves in the three-dimensional space, i.e., up and down, left and right, and back and forth. A combined image 43 obtained by superimposing the panned image 41 including the subject 46 on a zoom image 42 is projected onto a screen. Since a user 50 can feel the localization position of a sound image 45, the user 50 can understand motion of the subject 46 of the panned image 41 while watching the subject 46 of the zoom image 42.

For example, referring to FIG. 17A, a case where the subject 46 included in the panned image 41 approaches the user 50 will be discussed. In this case, the sound image 45 corresponding to a sound image of the subject 46 is localized in accordance with motion of the subject 46 as shown in FIG. 17B. The motion of the subject 46 can be determined from a change in the size of a contour of the subject 46 and a change in the magnitude of the motion vector. Accordingly, the user 50 can feel that the subject 46 approaches them.

The localization of a sound image is performed by speakers 51 and 52 provided on walls at respective sides. For example, if delayed sound is output from the speakers 51 and 52, the user 50 can feel localization of a sound image. As processing for changing the position of the sound image, motion of a sound image can be determined on the basis of a change in a motion amount instead of simply using a motion amount of an object. Here, the "motion amount" indicates an amount of movement determined from a difference between consecutive two frames. In addition, the "change in the motion amount" indicates a value obtained by differentiating the motion amount. For example, a case where a subject moves at a specific speed will be discussed. When the motion amount of the object is used, the sound image moves in accordance with the motion amount. On the other hand, when the change in the motion amount is used, the sound image does not move. In this case, since the change in the motion amount increases when the moving speed of the object is increased or the moving direction is changed, the position of the sound image moves.

Figure 18A:
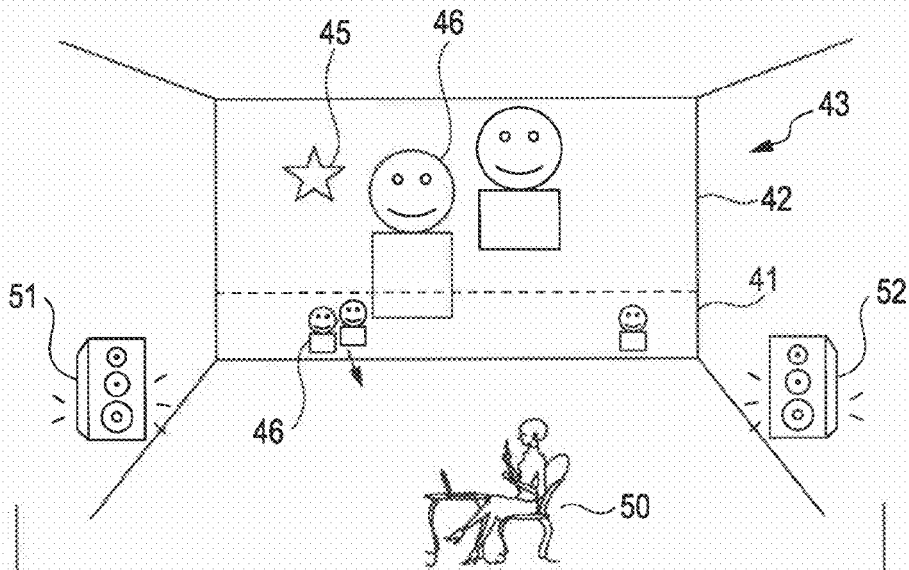
FIGS. 18A and 18B are explanatory diagrams showing an example of a localization position of a sound image of a panned image that changes as time passes according to an embodiment of the present invention.
Figure 18B:
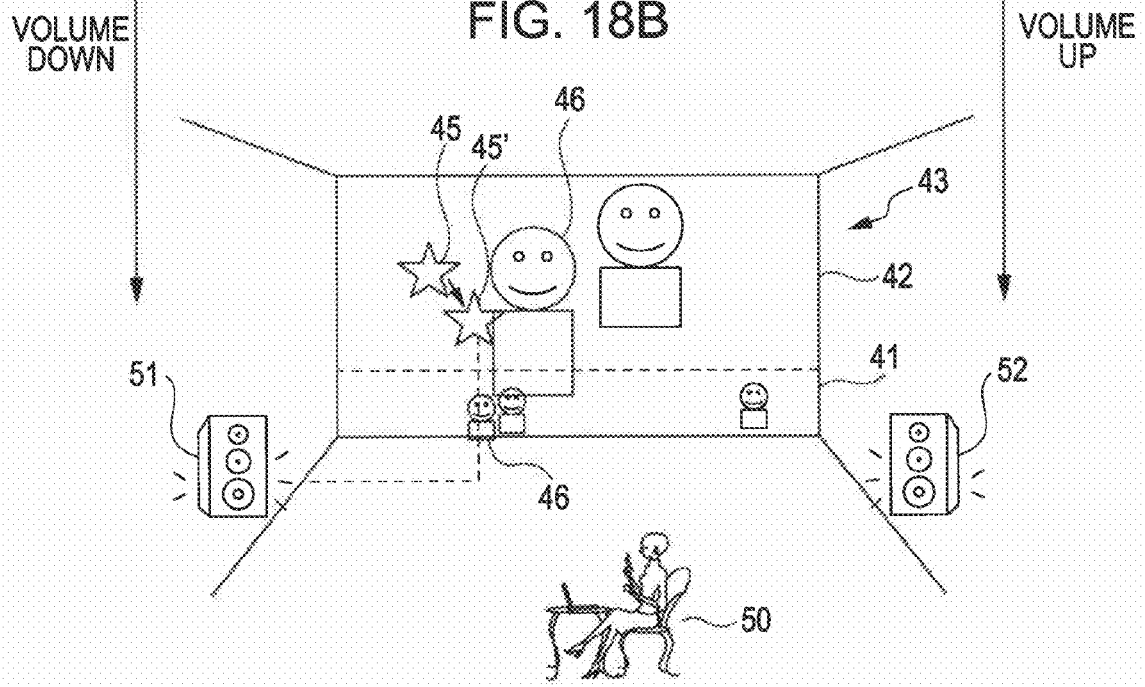

FIGS. 18A and 18B show examples of a localization position of a sound image of a panned image that changes as time passes. Similar or like numerals are attached to parts commonly shown in FIGS. 18A and 18B and FIGS. 17A and 17B having been described above and a detailed description thereof is omitted.

FIG. 18A shows an example of a combined image and an example of a sound image at time t.

FIG. 18B shows an example of a combined image and an example of a sound image at time t+1.

If sound is recorded at the time of capturing of a panned image, processing for changing volume in accordance with a change in a zoom image is also performed.

In this embodiment, a localization position of a sound image of a panned image 41 changes. For example, in a scene that a subject 46 focused by a user 50 moves from the left to the right, volume of sound output from a left speaker is turned down whereas volume of sound output from a right speaker is turned up. Accordingly, the user 50 can feel the position of the sound image.

As described above, the information processing apparatus 10 according to this embodiment can select a main image and a sub image from images captured by a plurality of cameras and can freely superimpose and combine the main and sub images. At this time, a user can selects images to be combined and change a zoom ratio or clipping of the selected images through an operation. Accordingly, it becomes easier for the user to move their line of sight to watch a subject included in a plurality of images. In addition, the user can efficiently view images of a plurality of angles by following guidance of sound.

The user's line of sight is guided not only by images but also by an effect of sound. Accordingly, even if the same object is displayed at remote positions, the user can easily move their line of sight and can easily recognize the object. When information presented to the user is an image, the information (image) is presented in a plane, such as a display panel. However, when the information presented to the user is audio, a position of a sound image thereof can be represented by localizing the sound image in a three-dimensional space. In the related art, since relational information between the sound and the image represented by a zoom image and a sound image that moves in a space is weak, it is difficult to recognize the relationship between the sound and the image at the same time. To cope with this issue, by localizing a sound image on the basis of audio of a panned image while presenting the panned image and by displaying a zoom image superimposed on the panned image, the user can view a plurality of images at the same time. With such a configuration, the user can understand the relationship between a circumstance shown in the focused zoom image and the subject included in the panned image, which is not understood when each image is presented, while viewing a plurality of images at the same time.

In addition, the user can listen to sound whose sound image is localized on the basis of a panned image displayed as a sub image while viewing a zoom image displayed as a main image. Accordingly, the user can easily understand a positional relationship of the subject included in the panned image.

When a plurality of screens are arranged to display a plurality of images as in the related art, each image is displayed in a size smaller than the original one. However, by displaying superimposed images as in this embodiment, the size of the main image can be maintained. Accordingly, impact of the main image is not reduced even if a plurality of images are displayed.

Even if a plurality of images are superimposed after removal of a redundant part common to the plurality of images, the user can instinctively understand content of each image. Since an important part is arranged on the top image of the superimposed images, the user can advantageously view background images whose content is not hidden greatly.

A sub image is superimposed on only a part of a main image specified by the user (or the information processing apparatus 10). Thus, it becomes easier to simultaneously compare a plurality of images captured at different angles compared with a case of viewing two arranged images as in the related art. In addition, an image that changes in response to a temporal change of the first image may be superimposed as the second image to be combined with the first image by the image combining unit 25. For example, when processing an image to be superimposed by zooming the image frame, a user may superimpose a plurality of images by shifting capturing time by unit time. In this case, the user can advantageously understand the temporal change of the same subject clearly.

The present invention is not limited to the above-described embodiment. Other embodiments will be described below with reference to FIGS. 19-21. Similar or like numerals are attached to parts commonly shown in FIGS. 19-21 and FIGS. 17A and 17B having been described before and a detailed description thereof is omitted.

Figure 19:
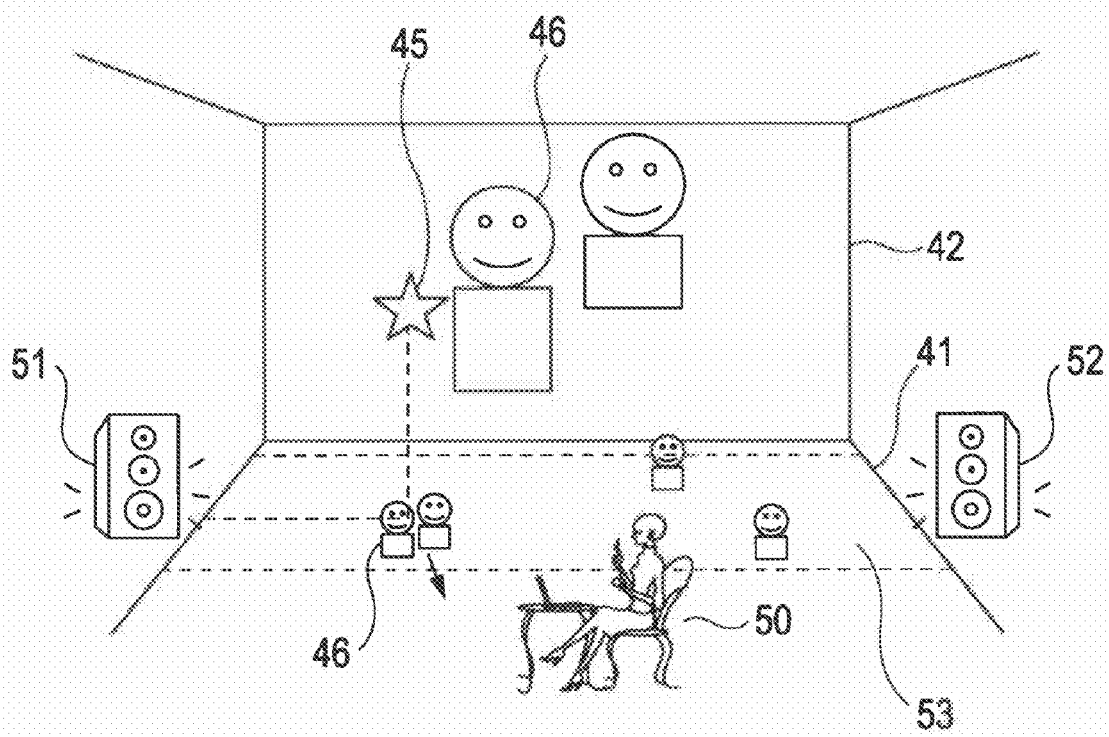
FIG. 19 is an explanatory diagram showing an example in which images are presented on a plurality of screens according to another embodiment of the present invention.

FIG. 19 shows an example in which a panned image 41 is presented on a floor display device 53, which is a display device installed on the floor.

In this embodiment, a plurality of images are output on two screens. At this time, a zoom image 42 is displayed on a wall display device, whereas the panned image 41 is displayed on the floor display device 53. The audio processing section 23 localizes a sound image as a subject 46 included in the panned image 41 moves away after eliminating high-frequency audio components. Accordingly, sound becomes unclear as the subject 46 moves away. Thus, a user can feel movement of the sound image 45 in response to the motion of the subject 46 shown in the panned image 41.

Figure 20:
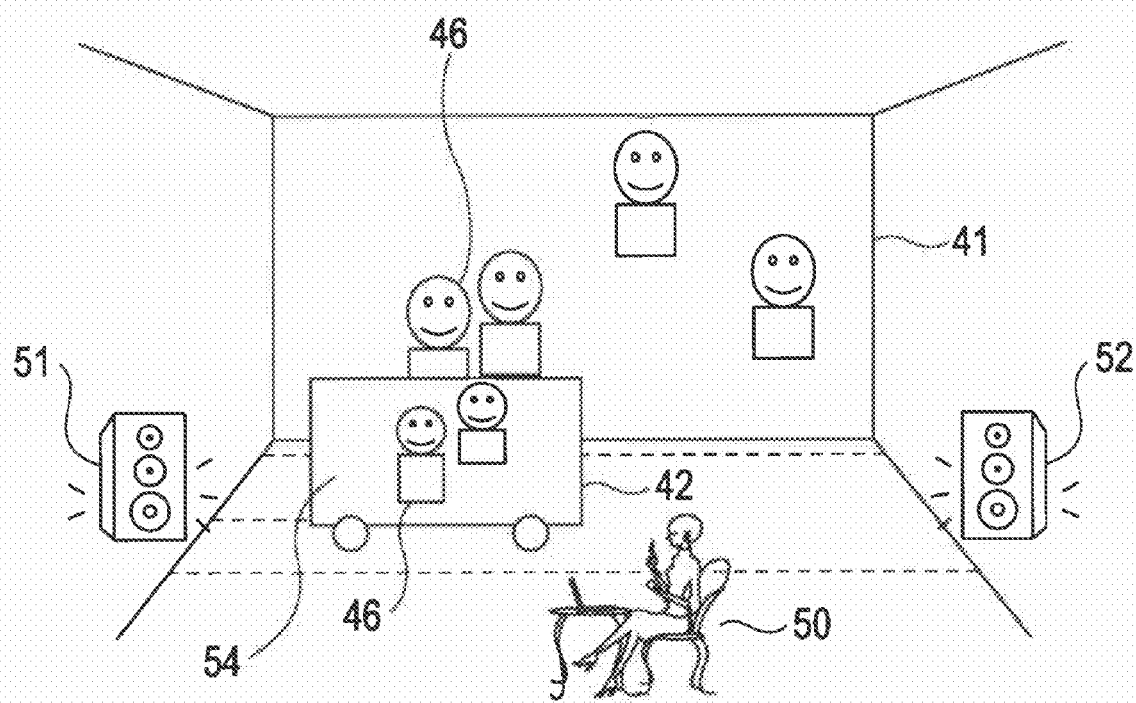
FIG. 20 is an explanatory diagram showing an example in which images are presented on a movable display device according to another embodiment of the present invention.

FIG. 20 shows an example in which a zoom image 42 is displayed on a movable display device 54, which can be moved back and forth and around.

In this embodiment, the zoom image 42 is displayed on the movable display device 54. At this time, a sound image is localized in accordance with motion of a panned image 41. A user 50 can know a position of a subject included in the panned image 41 while watching a subject 46 displayed on the movable display device 54.

Figure 21:
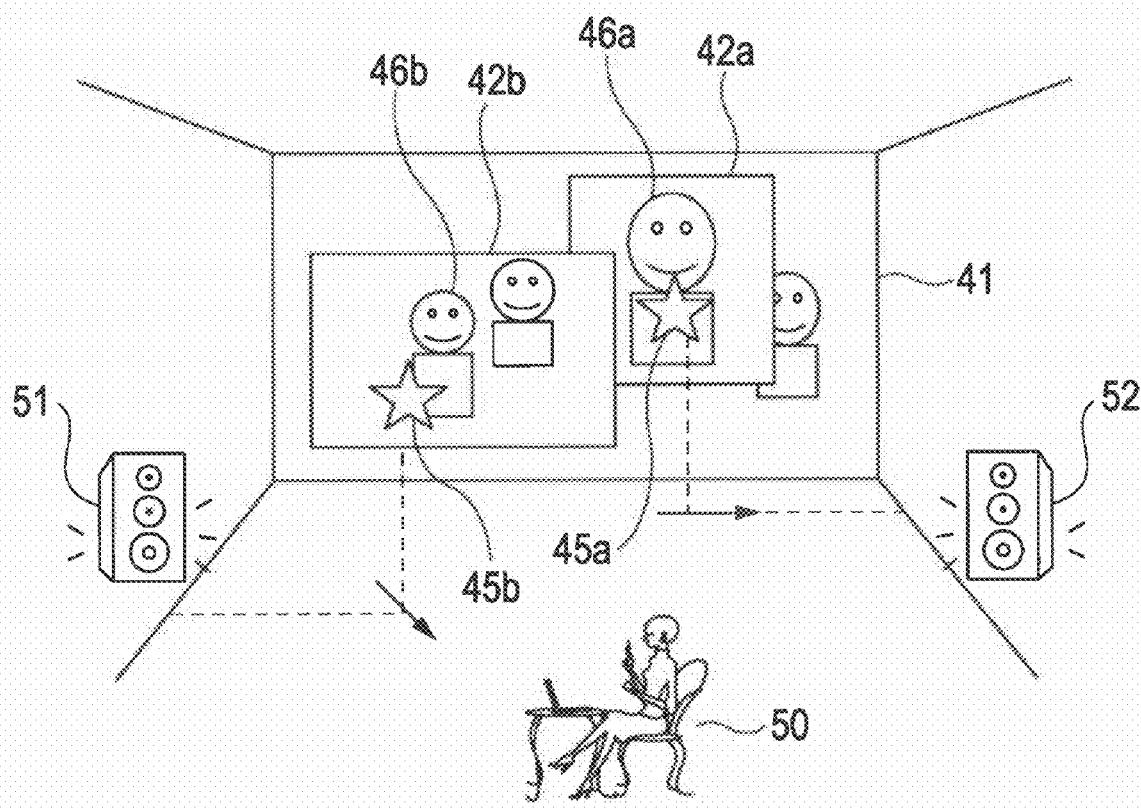
FIG. 21 is an explanatory diagram showing an example in which three or more images are simultaneously presented according to another embodiment of the present invention.

FIG. 21 shows an example in which a combined image resulting from combination of three or more images is presented.

In this embodiment, zoom images 42a and 42b are superimposed on respective subjects included in a panned image 41. Sound images 45a and 45b are localized in accordance with subjects 46a and 46b included in the zoom images 42a and 42b, respectively. The sound images 45a and 45b are localized on the basis of a positional relationship of subjects included in the panned image 41. Accordingly, the user 50 can easily understand a relationship between the images even if three or more images are simultaneously displayed on one screen. The number of images to be displayed is not limited.

The image outputting methods and the audio outputting methods shown in FIGS. 19-21 may be combined. At this time, various presenting methods may be selected. For example, images may be superimposed in accordance with a position of an object, a combined image may be displayed using the PinP function, or images may be displayed on another display device.

The series of processing steps according to the above-described embodiments can be executed by hardware or software. When the series of steps is executed by software, programs constituting the software may be installed in a computer embedded in a dedicated hardware or, for example, a general-purpose personal computer capable of executing various functions by installing various programs before execution of the programs.

A recording medium storing a program code of the software for realizing the functions of the above-described embodiments is supplied to a system or an apparatus. A computer (or a controller such as a CPU) of the system or the apparatus reads out and executes the program code stored on the recording medium. In this manner, the functions of the above-described embodiments are also achieved.

As the recording medium for supplying the program code in this case, for example, a flexible disk, a hard disk, an optical disc such as a CD-ROM and a CD-R, a magneto-optical disk, a magnetic tape, a nonvolatile memory card, and a ROM can be used.

In addition to realization of the functions of the above-described embodiments by the computer's execution of the read out program code, a case where an operating system (OS) running on the computer executes part or all of actual processing on the basis of instructions of the program code and the functions of the above-described embodiments are realized by the processing is also included in the present invention.

In this specification, the steps described in the program constituting the software include processing that is executed sequentially in the described order, and also includes processing that is executed in parallel or individually, not necessarily sequentially.

The present invention is not limited to the above-described embodiments, various other configurations can be employed without departing from the spirit of the present invention.

The present application contains subject matter related to that disclosed in Japanese Priority Patent Application JP 2008-097510 filed in the Japan Patent Office on Apr. 3, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a feature value detecting section configured to determine, when a first image and a second image that are captured at different positions include a specific subject, a feature value of the subject included in the supplied first and second images;
an image processing section configured to detect motion of the subject on the basis of the feature value determined by the feature value detecting section; and
an audio processing section configured to localize a sound image of the subject in accordance with the motion of the subject detected by the image processing section.

2. The apparatus according to claim 1, wherein the image processing section includes:
a removal area detecting unit configured to identify a common color gamut on the basis of the feature value using color gamuts of the first and second images determined by the feature value detecting section as the feature value and to remove an area corresponding to the common color gamut from the second image; and
an image combining unit configured to superimpose the second image from which the area corresponding to the common color gamut is removed by the removal area detecting unit on the first image to combine the first and second images.

3. The apparatus according to claim 2, wherein the feature value detecting section extracts a color gamut having a value exceeding a predetermined threshold as feature areas of the first and second images, and the value is obtained by accumulating, for each color gamut of each image, an appearing frequency of the color gamut in a predetermined color coordinate system detected for each pixel constituting the first and second images, and
wherein the removal area detecting unit removes, from the second image, an area corresponding to a color gamut common to the feature area of the first image and the feature area of the second image.

4. The apparatus according to claim 3, wherein the first image is a panned image of the subject, and
wherein the second image is a zoom image of the subject included in the first image.

5. The apparatus according to claim 4, wherein the audio processing section localizes the sound image after eliminating high-frequency audio components as the subject included in the first image moves away.

6. The apparatus according to claim 4, further comprising:
an operation section configured to adjust volume of the sound of the sound image of the subject, included in the first image, localized by the audio processing section.

7. The apparatus according to claim 2, the image combining unit superimposes the second image that changes in response to a temporal change of the first image on the first image.

8. The apparatus according to claim 1, wherein the image processing section outputs the processed image to an output device that displays images.

9. An image processing method comprising the steps of:
determining, when a first image and a second image that are captured at different positions include a specific subject, a feature value of the subject included in the supplied first and second images;
detecting motion of the subject on the basis of the feature value; and
localizing a sound image of the subject in accordance with the detected motion of the subject.

10. A non-transitory computer-readable medium storing a program allowing a computer to execute an image processing method, the method comprising the steps of:
determining, when a first image and a second image that are captured at different positions include a specific subject, a feature value of the subject included in the supplied first and second images;
detecting motion of the subject on the basis of the feature value; and
localizing a sound image of the subject in accordance with the detected motion of the subject.

* * * * *